US008671284B1

(12) United States Patent
Bloom et al.

(10) Patent No.: US 8,671,284 B1
(45) Date of Patent: *Mar. 11, 2014

(54) SECURITY MODEL FOR ACTOR-BASED LANGUAGES AND APPARATUS, METHODS, AND COMPUTER PROGRAMMING PRODUCTS USING SAME

(75) Inventors: Bard Bloom, Dobbs Ferry, NY (US); John H. Field, Middlebury, CT (US); Salvatore Guarnieri, New York, NY (US); Marco Pistoia, Amawalk, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/611,064

(22) Filed: Sep. 12, 2012

Related U.S. Application Data

(63) Continuation of application No. 13/588,347, filed on Aug. 17, 2012.

(51) Int. Cl.
*G06F 9/44* (2006.01)

(52) U.S. Cl.
USPC .......................................... 713/189; 717/120

(58) Field of Classification Search
USPC .......................................... 713/189; 717/120
See application file for complete search history.

(56) References Cited

U.S. PATENT DOCUMENTS

| 7,444,644 B1 * | 10/2008 | Slaughter et al. ............. 719/315 |
| 2008/0189676 A1 * | 8/2008 | Satoh et al. .................... 717/104 |
| 2009/0125977 A1 * | 5/2009 | Chander et al. ................... 726/1 |

OTHER PUBLICATIONS

Geay et al., "Modular String-Sensitive Permission Analysis with Demand-Driven Precision", May 2009, ICSE, pp. 177-187.*
Armstrong, J.; "Programming Erlang: Software for a Concurrent World"; 2007; whole document (519 pages); The Pragmatic Bookshelf; Raleigh, NC, USA.
Bloom, B., et al.; "Thorn: Robust, Concurrent, Extensible Scripting on the JVM"; Proceeding of the 24th ACM SIGPLAN Conference on Object Oriented Programming Systems Languages and Applications, OOPSLA 2009; pp. 117-136; ACM; New York, NY, USA.
Geay, E., et al.; "Modular String-Sensitive Permission Analysis with Demand-Driven Precision"; 31st International Conference on Software Engineering (ICSE 2009); 2009; whole document (11 pages); Minneapolis, MN, USA.
Gong, L., et al.; "Going Beyond the Sandbox: An Overview of the New Security Architecture in the Java Development Kit 1.2"; USENIX Symposium on Internet Technologies and Systems; Dec. 1997; whole document (10 pages); Monterey, CA, USA.

(Continued)

*Primary Examiner* — Matthew Smithers
(74) *Attorney, Agent, or Firm* — Harrington & Smith

(57) ABSTRACT

An application includes: a programming model including a service provider, first components, second components, and sinks communicating via messages. Each of the second components is assigned a unique capability. A given one of the first components routes a message from the given first component to second component(s) and then to a sink. Each of the second component(s) sends the message to the service provider. The service provider creates a token corresponding at least to a received message and a unique capability assigned to an associated one of the second component(s) and sends the token to the associated one of the second component(s). The selected sink receives the message and a token corresponding to each of the second component(s), verifies each received token, and either accepts the message if each of the received tokens is verified or ignores the message if at least one of the received tokens is not verified.

20 Claims, 21 Drawing Sheets

(56) References Cited

OTHER PUBLICATIONS

Gong, L., et al.; "Implementing Protection Domains in the Java Development Kit 1.2"; Proceedings of the Network and Distributed System Security (NDSS 1997) Symposium; Dec. 1997; whole document (10 pages); San Diego, CA, USA.

Hewitt, C., et al.; "A Universal Modular Actor Formalism for Artificial Intelligence"; Proceedings of the Third International Joint Conference on Artificial Intelligence (IJCAI 1973); Aug. 1973; whole document (11 pages).

Koved, L., et al.; "Access Rights Analysis for Java"; 17th ACM SIGPLAN Conference on Object-Oriented Programming, Systems, Languages, and Applications (OOPSLA 2002); Nov. 2002; pp. 359-372; ACM Press; Seattle, WA, USA.

Kozen, D.; "Language-Based Security"; Proc. Conf. Mathematical Foundations of Computer Science (MFCS'99), vol. 1672 of Lecture Notes in Computer Science; Sep. 1999; pp. 284-298; Springer-Verlag.

Levy, H.M.; "Capability- and Object-Based Computer Systems"; 1984; whole document (20 pages); Butterworth-Heinemann; Newton, MA, USA.

Myers, A.C.; "JFlow: Practical Mostly-Static Information Flow Control"; Proceedings of the 26th ACM Symposium on Principles of Programming Languages (POPL'99); Jan. 1999; whole document (17 pages); San Antonio, TX, USA.

Pistoia, M., et al.; "Beyond Stack Inspection: A Unified Access Control and Information Flow Security Model"; 28th IEEE Symposium on Security and Privacy (SP'07); May 2007; pp. 149-163; IEEE; Oakland, CA, USA.

Pistoia, M., et al.; "Interprocedural Analysis for Privileged Code Placement and Tainted Variable Detection"; ECOOP 2005; 2005; whole document (362 pages); Springer-Verlag; Berlin Heidelberg.

Saltzer, J.H., et al.; "The Protection of Information in Computer Systems"; Proceedings of the IEEE, vol. 63; pp. 1278-1308; Sep. 1975; whole document (30 pages).

Shinnar, A., et al.; "A Language for Information Flow: Dynamic Tracking in Multiple Interdependent Dimensions"; Proceedings of the ACM SIG-PLAN Fourth Workshop on Programming Languages and Analysis for Security (PLAS'09); 2009; pp. 125-131; ACM; New York, NY, USA.

Swamy, N., et al.; "FABLE: A Language for Enforcing User-defined Security Policies"; Proceedings of the 2008 IEEE Symposium on Security and Privacy; 2008; pp. 369-383; IEEE Computer Society; Washington, DC, USA.

Wulf, W., et al.; "HYDRA: The Kernel of a Multiprocessor Operating System"; Jun. 1974; pp. 337-345; ACM.

Habeck, T., et al.; "SWORD4J: Security WORkbench Development environment 4 Java"; May 12, 2008; whole document (14 pages); IBM Research Report RC24554 (W0805-065); Computer Science.

Ruderman, J; "Same-origin policy"; Nov. 3, 2011; whole document (6 pages); https://developer.mozilla.org/en-US/docs/Web/JavaScript/Same_origin_policy_for_JavaScript.

"Open Web Application Security Project (OWASP)"; downloaded from the Internet Oct. 9, 2013; whole document (5 pages); https://www.owasp.org.

"HTML5, A vocabulary and associated APIs for HTML and XHTML"; downloaded from the Internet Oct. 9, 2013; whole document (22 pages); http://www.w3.org/TR/html5.

Lai, C. et al.; "User Authentication and Authorization in the Java™ Platform"; Annual Computer Security Applications Conference 1999; whole document (6 pages); IEEE.

* cited by examiner

```
1   spawn EyeCore {
2     import EYEBOOK.*;  //....
3     cookies = table=(username)(var cookie);  //....
4
5     sync genCookie(username) {
6       c = username + (10.rand);
7       cookies(username) := <cookie=c>;
8       c;
9     }
10    sync passwordIsRight?(uname, pword) = (db <-> passwordIsRight?(uname, pword)); //...
11    body {
12      while(true) {
13        serve
14          before(x) { log("EyeCore about to $x"); }
15          timeout(5000) { log("I am alive!"); }
16      }
17    }body
18
19    sync cookie2user(c) = {
20      %first(u | for <username=u, cookie=$(c)> <-" cookies);
21    }
22
23  }EyeCore;
```

FIG. 7

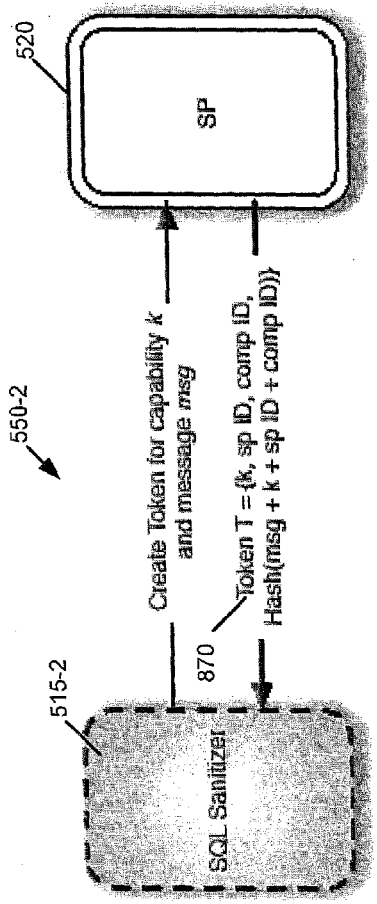
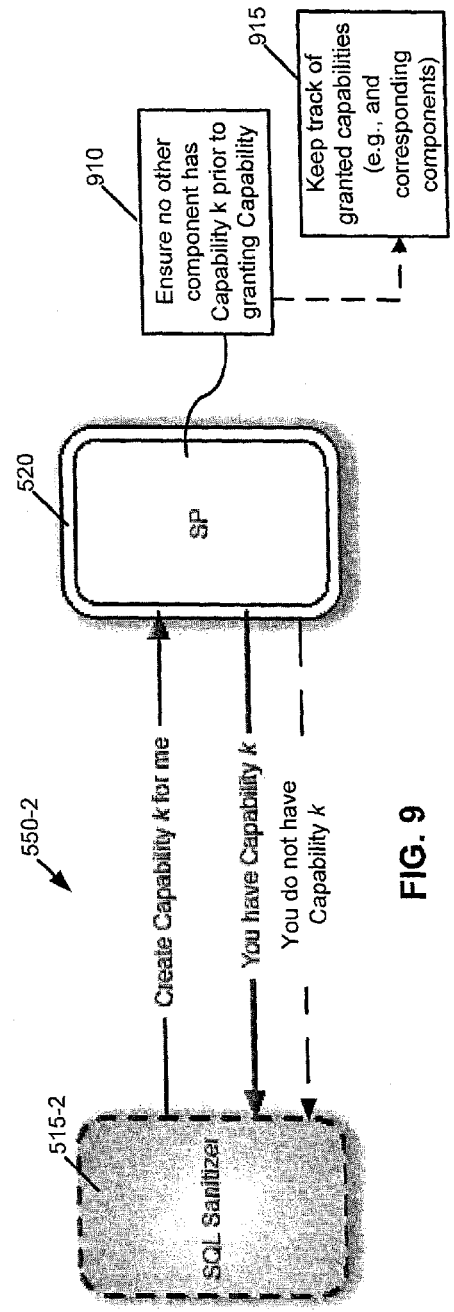
FIG. 8
FIG. 9

| # | From | To | Message | Token Attached |
|---|------|-----|---------|----------------|
| 1 | Stats Plugin | Authenticator | Login with ID: "Gross Statistic Aggregator" and password: "analyze" | |
| 2 | Authenticator | SP | Grant capability "data totals" to Stats Widget | |
| 3 | Authenticator | Stats Plugin | You now have capability: "data totals" | |
| 4 | Stats Plugin | SP | Make token for message: "Get total number of users" with capability "data totals" | |
| 5 | SP | Stats Plugin | Here is token $T$ for your message | |
| 6 | Stats Plugin | DB | "Get total number of users" | $T$ |
| 7 | DB | Stats Plugin | 5 | |

FIG. 12

| # | From | To | Message | Token Attached |
|---|---|---|---|---|
| 4 | Stats Plugin | SP | Make token for message: "Get total number of users" with capability "data totals" | - |
| 5 | SP | Stats Plugin | Here is token $T$ for your message | - |
| 6 | Stats Plugin | DB | "Get total number of users" | $T$ |
| 7 | DB | Stats Plugin | 5 | - |
| 8 | Stats Plugin | DB | "Get total number of users" | $T$ |
| 9 | DB | Stats Plugin | 5 | - |

FIG. 13

| # | From | To | Message | Token Attached |
|---|---|---|---|---|
| 1 | EyeBook Core | SQL Sanitizer | "SELECT * FROM T WHERE ID=?", "5 OR 1=1" | - |
| 2 | SQL Sanitizer | SP | Make a token for *Safe DB Query* with capability "sql-safe" | |
| 3 | SP | SQL Sanitizer | Here is token *T* | *T* |
| 4 | SQL Sanitizer | EyeBook Core | *Safe DB Query, T* | *T* |
| 5 | EyeBook Core | DB | *Safe DB Query* | |

FIG. 15

| # | From | To | Message | Token Attached |
|---|---|---|---|---|
| 1 | EyeBook Core | SQL Sanitizer | "SELECT * FROM T WHERE ID=?", "5 OR 1=1", DB | T |
| 2 | SQL Sanitizer | SP | Make a token for Safe DB Query with capability "sql-safe" and send to DB | |
| 3 | SP | DB | Safe DB Query | T |

FIG. 16

| # | From | To | Message | Token Attached |
|---|---|---|---|---|
| 1 | DB | SP | Grant me a unique capability | - |
| 2 | SP | DB | Capability: $k$ | - |
| 3 | DB | SP | Grant Photo Editor $k$ | - |
| 4 | SP | Photo Editor | Capability: $k$ | - |
| 5 | EyeBook Core | Photo Editor | Photo: $p, ...$ | - |
| 6 | Photo Editor | EyeBook Core | Popup link: $l$ | - |
| 7 | Photo Editor | SP | Load $p$ using capability $k$ | $t_1$ |
| 8 | SP | DB | Load $p$ | - |
| 9 | DB | Photo Editor | Picture $p$ | - |
| 10 | Photo Editor | SP | Save $p$ with data: $d$ using capability $k$ | - |
| 11 | SP | DB | Save $p$ with data: $d$ | $t_2$ |

FIG. 21

SECURITY MODEL FOR ACTOR-BASED LANGUAGES AND APPARATUS, METHODS, AND COMPUTER PROGRAMMING PRODUCTS USING SAME

CROSS-REFERENCE TO RELATED APPLICATIONS

This is a continuation of U.S. patent Ser. No. 13/588,347, filed on Aug. 17, 2012, which is incorporated by reference in its entirety.

BACKGROUND

This invention relates generally to programming languages and, more specifically, relates to security models for programming languages.

The purpose of language-based security is to make applications more secure by embedding security mechanisms inside the programming languages in which those applications are written. See D. Kozen et al., "Language-based security", in Proc. Conf. Mathematical Foundations of Computer Science (MFCS'99), volume 1672 of Lecture Notes in Computer Science, pages 284-298, Springer-Verlag, September 1999. The advantages of this method are multiple. For example, developers are not required to implement ad hoc security mechanisms—an often error-prone and time-consuming approach. Furthermore, applications developed on top of a language that supports certain security mechanisms can be designed with security in mind, and are easily portable from one platform to the other. Finally, writing more secure applications when support is embedded in the underlying language can often be as simple as calling certain libraries. This greatly simplifies secure code development even for people who are not security experts. However, most programming languages do not have enough security in them, and requiring a developer to use libraries in order to provide security means that mistakes will be common.

One attempt to improve certain aspects of security is through the use of actor-based languages. In such languages, components are completely isolated from each other and communication is via message passage only. Nonetheless, these types of languages have additional problems explained in more detail below.

BRIEF SUMMARY

In an exemplary embodiment, a method includes providing an application including: a programming model comprising a service provider, one or more first components, one or more second components, and one or more sinks. Each of the one or more second components is assigned a unique capability. The first and second components and sinks communicate using messages. The method includes a given one of the first components routing a message comprising information from the given first component to at least one of the one or more second components and then to a selected one of the sinks and each of the at least one of the second components sending the message to the service provider. The method further includes the service provider creating a token corresponding at least to a received message and a unique capability assigned to an associated one of the second components and sending the token to the associated one of the second components. The method also includes the selected sink receiving the message and a token corresponding to each of the at least one second components, verifying each received token, and either accepting the message in response to each of the received tokens being verified and performing one or more actions using the message or ignoring the message in response to at least one of the received tokens not being verified.

Apparatus and computer program products are also disclosed.

BRIEF DESCRIPTION OF THE SEVERAL VIEWS OF THE DRAWINGS

FIG. 7 is an example of EyeCore.th source code;

FIG. 8 illustrates an example of messaging for token creation for an SQL sanitizer component;

FIG. 9 illustrates an example of messaging for capability creation for an SQL sanitizer component;

FIG. 12 is a table (Table 1) of a message sequence for a Stats Plugin component to login to and query the database;

FIG. 13 is a table (Table 2) of an optimized message sequence for a Stats Plugin component to login to and query the database;

FIG. 15 is a table (Table 3) of a message sequence to send a safe query to the database;

FIG. 16 is a table (Table 4) of an optimized message sequence to send a safe query to the database;

FIG. 21 is a table (Table 5) of messaging for editing a photograph;

DETAILED DESCRIPTION

Figure 1:
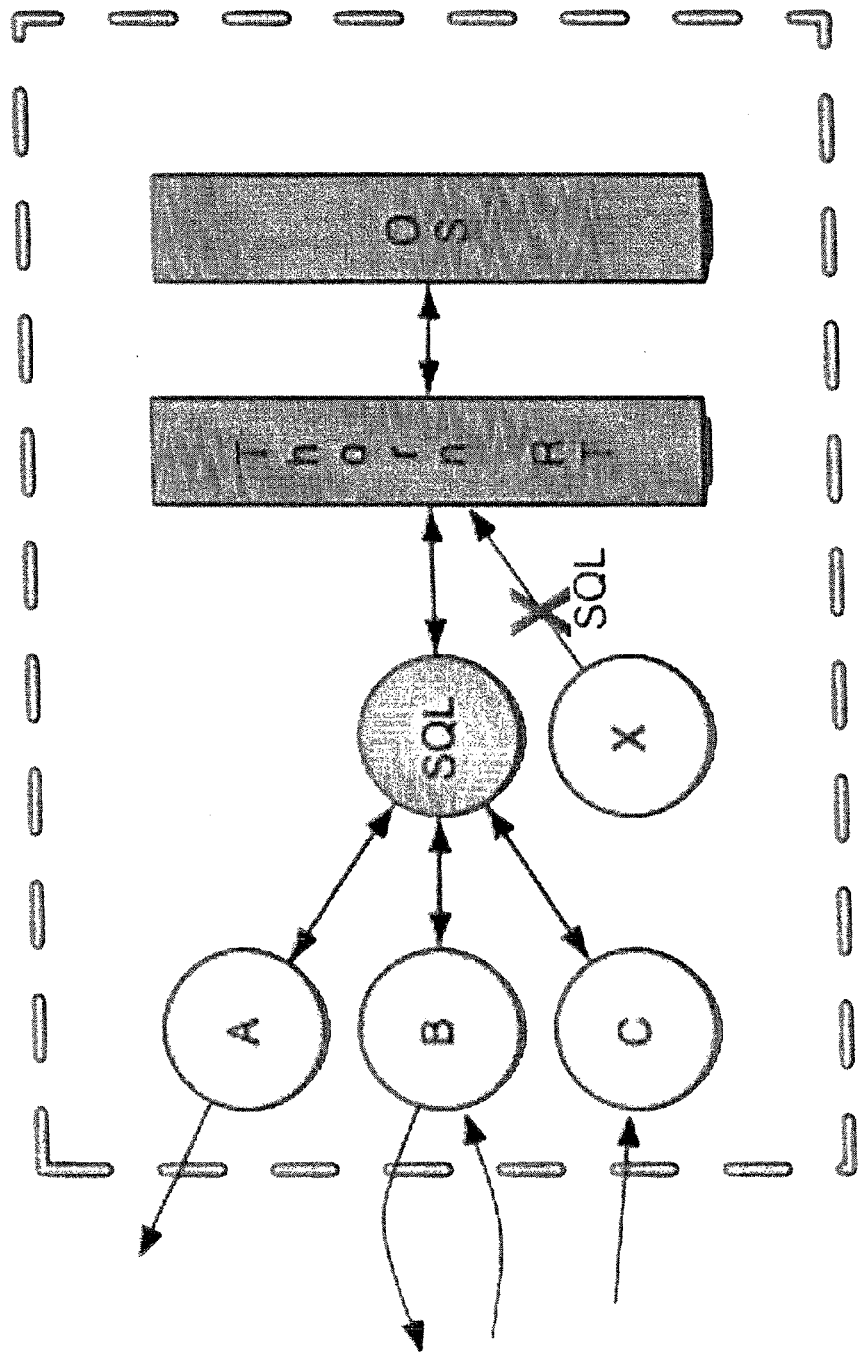
FIG. 1 is an illustration of a program operating in accordance with a Thorn programming model.

As stated previously, the purpose of language-based security is to make applications more secure by embedding security mechanisms inside the programming languages in which those applications are written. Research in the area of language-based security has become very active in the past fifteen years, starting with the advent of Java (a programming language and computing platform first released by Sun Microsystems in 1995) in the mid 1990s. With Java, it became possible for the first time to add dynamic content to Web pages in the form of Java applets. This was an attractive enhancement for the Web, since Web pages up to that point had only been static. However, it also created the possibility for attackers to exploit potential vulnerabilities in the underlying Java runtime environment of remote systems for endusers, and compromise its integrity and confidentiality. To address these concerns, the first version of Java was released with a binary access-control model, allowing local Java applications to enjoy full access to all the system resources. However, remote Java applets embedded in remote Web pages had to stay confined in a sandbox (an isolated area so that a program being executed on a system in the sandbox should not affect other programs or the system), where the only operations permitted to them were limited to Web page animations. This binary access-control model did not allow for significant improvements in the experience of the enduser, and could almost never be used to delegate server-side computations to the client—which is one of the advantages of embedding code in Web pages. The second release of Java partially overcame these limitations by allowing remote applets to be treated as local applications as long as those applets were digitally signed by a trusted entity. Although Java allowed remote code, if trusted, to access to system resources, this access-control model was still binary in the sense that code could only be either completely trusted or completely untrusted.

A major improvement came in 1998 with the release of the Java 2 platform, which was the first language to offer a fine-grained access-control model. See L. Gong and R. Schemers, "Implementing Protection Domains in the Java Development Kit 1.2", in Proceedings of the Network and Distributed System Security (NDSS 1997) Symposium, San Diego, Calif., USA, December 1997. This is still the security model used by Java, and has also been adopted by the .NET platform. This model accounts for the fact that code providers can be as malicious for a remote system as the users running the code. Therefore, this model associates an identity to any loaded class. The identity is computed as a combination of the Uniform Resource Locator (URL) from which the class is loaded and the identities of the entities that digitally signed the class file itself. A statically defined security policy grants permissions to such entities, such as the permission to write to a particular file or to open a socket connection with a certain host on a given port. This permission-based architecture is a departure from the previous binary model. At run time, whenever access to a security-sensitive resource is attempted, a special component called SecurityManager performs a backwards stack inspection, verifying that all the methods currently on the stack are defined in classes that have been granted sufficient permissions to execute the security-sensitive operation. See L. Gong, et al., "Going Beyond the Sandbox: An Overview of the New Security Architecture in the Java Development Kit 1.2", in USENIX Symposium on Internet Technologies and Systems, Monterey, Calif., USA, December 1997.

This model has also been augmented to account for the permissions granted to the subjects executing the code: the permissions granted to a certain subject are added to all the stack frames executed under the authority of that subject. See C. Lai, et al., "User Authentication and Authorization in the Java™ Platform", in 15th Annual Computer Security Applications Conference (ACSAC 1999), pages 285-290, Scottsdale, Ariz., USA, December 1999. At the point in which a stack inspection is performed, each method on the stack must belong to a sufficiently authorized class or be executed by a sufficiently authorized subject.

The Java and .NET security model, though a major enhancement with respect to previous work in the area of language-based security, has significant limitations:

1. Its enforcement of access control is highly unsound because for every security-sensitive operation, the only code that gets checked is the one currently on the stack. Code that has influenced the security-sensitive operation under attempt and that has already popped out of the stack is not checked. See M. Pistoia, et al., "Beyond Stack Inspection: A Unified Access Control and Information Flow Security Model", in 28th IEEE Symposium on Security and Privacy, pages 149-163, Oakland, Calif., USA, May 2007.

2. While the security model attempts to enforce access control, it does nothing to track information flow. See A. Shinnar, et al., "A language for information flow: dynamic tracking in multiple interdependent dimensions", in Proceedings of the ACM SIGPLAN Fourth Workshop on Programming Languages and Analysis for Security, PLAS '09, pages 125-131, New York, N.Y., USA, 2009. ACM.

3. The security model allows for only one SecurityManager and one security policy to be in effect at any point in time on an entire Java Virtual Machine (JVM), thereby preventing any entity from being trusted by different classes at different levels.

4. A SecurityManager and the policy it enforces cannot be shared across different systems, not even when those systems are both Java systems.

5. SecurityManagers and policy providers must be of specific types, which reduce the flexibility of the security model.

6. Native code is not integrated into the Java security model and is, therefore, implicitly granted all permissions.

7. Configuring a security policy is very hard because configuration requires precomputing all the stacks ending in a security-sensitive operation in which any given method could participate.

The problem illustrated in Point 7 above is probably what has prevented the Java and .NET security model from becoming widely used, in spite of numerous tools developed and made available for automatic computation of access-control policies. For the numerous tools developed, see the following: L. Koved, et al., "Access Rights Analysis for Java", in 17th ACM SIGPLAN Conference on Object-Oriented Programming, Systems, Languages, and Applications (OOPSLA 2002), pages 359-372, Seattle, Wash., USA, November 2002. ACM Press; M. Pistoia, et al., "Interprocedural Analysis for Privileged Code Placement and Tainted Variable Detection", In ECOOP, 2005; E. Geay, et al., "Modular String-Sensitive Permission Analysis with Demand-Driven Precision", in 31st International Conference on Software Engineering (ICSE 2009), Minneapolis, Minn., USA, 2009. As for tools made available, see IBM (International Business Machines) Java Security Workbench Development for Java (SWORD4J), at alphaworks.ibm.com/tech/sword4j.

Another thing to observe is that in today's Web-application-based systems, access control is probably not the main issue any more. This is also confirmed by the fact that none of the top ten security vulnerability in today's software according to the Open Web Application Security Project (OWASP) is related to access control. Open Web Application Security Project (OWASP), owasp.org. In fact, the top six security vulnerabilities are all related to information flow, which is not addressed at all by stack inspection, as mentioned in Point 2 above. An extension to the Java language, called Jif, was designed to overcome Java's inability to track information flow. See the following: A. C. Myers, "JFlow: Practical Mostly-static Information Flow Control", in POPL, 1999; and A. Shinnar et al., "A language for information flow:

dynamic tracking in multiple interdependent dimensions", in Proceedings of the ACM SIGPLAN Fourth Workshop on Programming Languages and Analysis for Security, PLAS '09, pages 125-131, New York, N.Y., USA, 2009. Jif requires program variables to be statically tagged with integrity and/or confidentiality labels. A type system then verifies that there is no flow of untrusted data to trusted computations (an integrity violation) or private data to program release points (a confidentiality violation). However, this conservative approach to security has failed to enjoy broad adoption, also due to the difficulty of statically embedding security policies inside programs' source code, which requires security administrators to also be developers with deep knowledge of the source code they want to secure.

JavaScript, which has supplanted Java and .NET for client-side programming, has a security feature called same-origin policy, which allows only scripts originating from the same Web site to access each other's properties and functions. See Same-origin Policy, mozilla.org/projects/security. Attackers, however, have been able to bypass the same-origin policy by injecting specially crafted malicious scripts into otherwise legitimate Web pages. Once injected in a Web page, the malicious script has the same origin as the rest of the web page and can perform any number of exploits; the attackers have the full power of JavaScript at their disposal. The consequences for the Web site can be very serious, and may include Web-site defacement, breakage of integrity and confidentiality, and complete identity theft.

By contrast, exemplary embodiments of the instant invention provide one or more of the following:

1) A security model (called "Mercury") for actor-based languages;

2) The security model can be embedded into the language;

3) The security model can simultaneously enforce information-flow security and access control; and/or 4) The security model can track all important provenance information.

This security model introduces the concept of a security provider—which corresponds to a policy provider and a SecurityManager in Java and .NET, but with several differences:

1) A multi-trust system is implemented. Multiple security providers can be in effect at any time, thereby granting different components the flexibility to trust different security providers.

2) There are no restrictions on security providers or capabilities. Unlike the Java and .NET security model, this model does not impose any particular type on security providers; any component can be a security provider. Also, any object can be granted a capability.

3) The model is language and location agnostic. Components, regardless of the language in which the components are written, can trust and communicate with the same security providers whether or not those providers are located in the same site as those components.

Furthermore, the following illustrates differences with JavaScript: Individual messages passed between components can be endorsed by trusted entities in a cryptographically-secure manner, thereby overcoming the coarse-grained limitations of the same-origin-policy security model of JavaScript.

For ease of description, the instant disclosure is separated into a number of parts. First, a simplified description of exemplary embodiments is provided, and then a much more detailed description of the exemplary embodiments is provided.

Certain exemplary embodiments are described in relation to an actor-based language called Thorn, which is described in more detail below. Briefly, however, the current Thorn model provides the following:

Components are completely isolated from each other;

Communication is via message passing only;

Components cannot access the underlying system without going through other "special" components; and Messages can cause components possibly to cause security breaches, so the messages need to be secured.

FIG. 1 is an illustration of a program operating in accordance with a Thorn programming model, where components cannot access the underlying system without going through other "special" components. This example shows the components A, B, C, SQL, and X. The SQL component interfaces with the Thorn RT (runtime), which interfaces with the OS (operating system). In accordance with the Thorn programming model, the X component is not allowed to access the Thorn RT. Instead, the SQL component is a special component that can read from or write to a disk (not shown). Although the use of special components increases security, there are still faults with the Thorn programming model.

Figure 2:
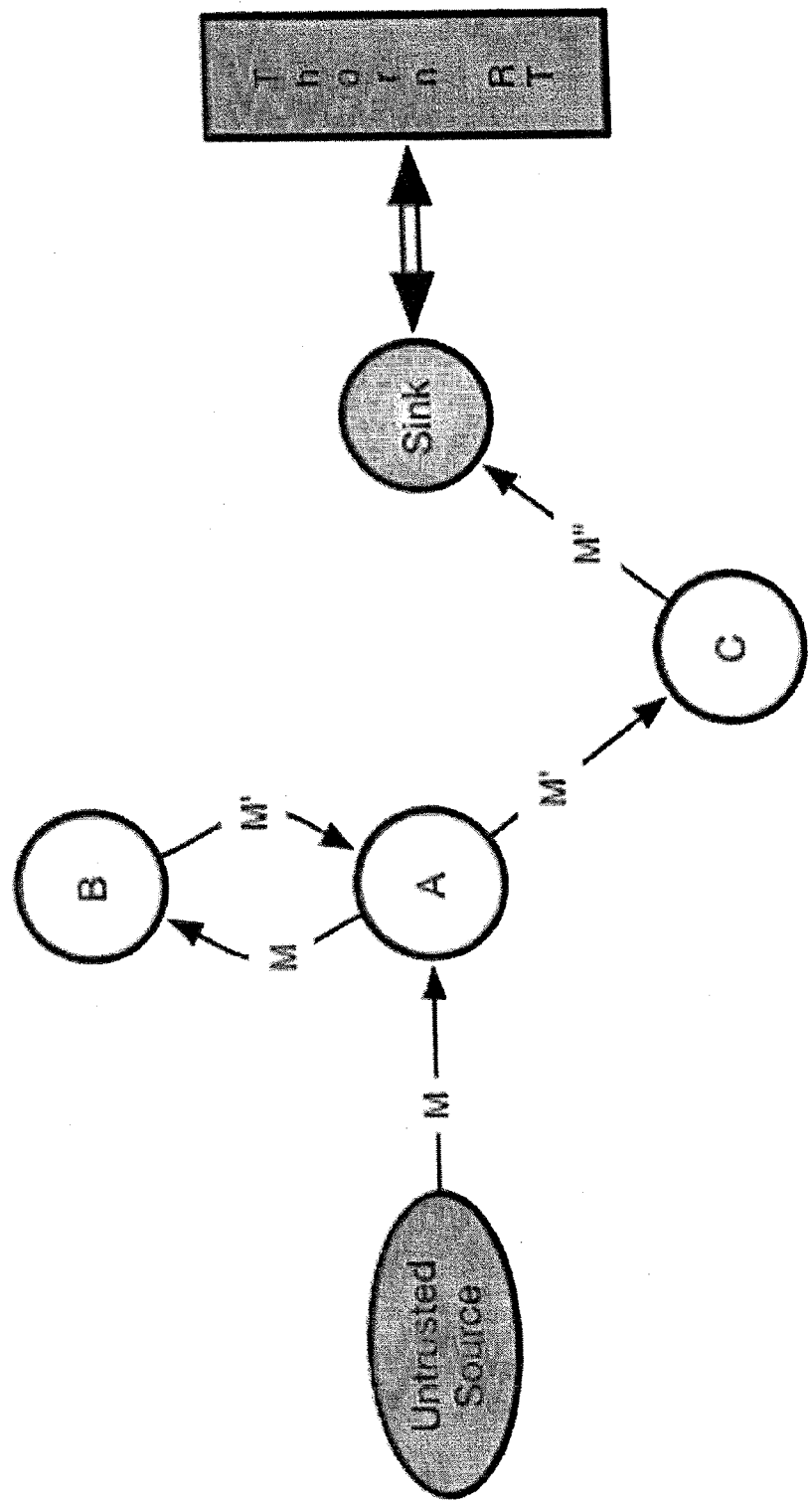
FIG. 2 illustrates flow for a typical program using a Thorn programming model.

FIG. 2 illustrates flow for a typical program using a Thorn programming model. This figure is used to illustrate potential security faults with the Thorn programming model. A user writes components A, B, and C. In this example, the untrusted source provides information M via a message to component A. Component A then passes M via a message to component B, which performs operation(s) on M to create M'. The component B passes M' via a message back to the component A. Component A then passes M' via a message to component C, which performs operation(s) on M' to create M". Component C then passes M" via a message to the Sink component, which interfaces with the Thorn RT.

The user has no control over the untrusted source, the sink, and the Thorn RT. A critical issue is, why should the sink component trust M" and execute on M"? This can be answered with information flow.

Figure 3:
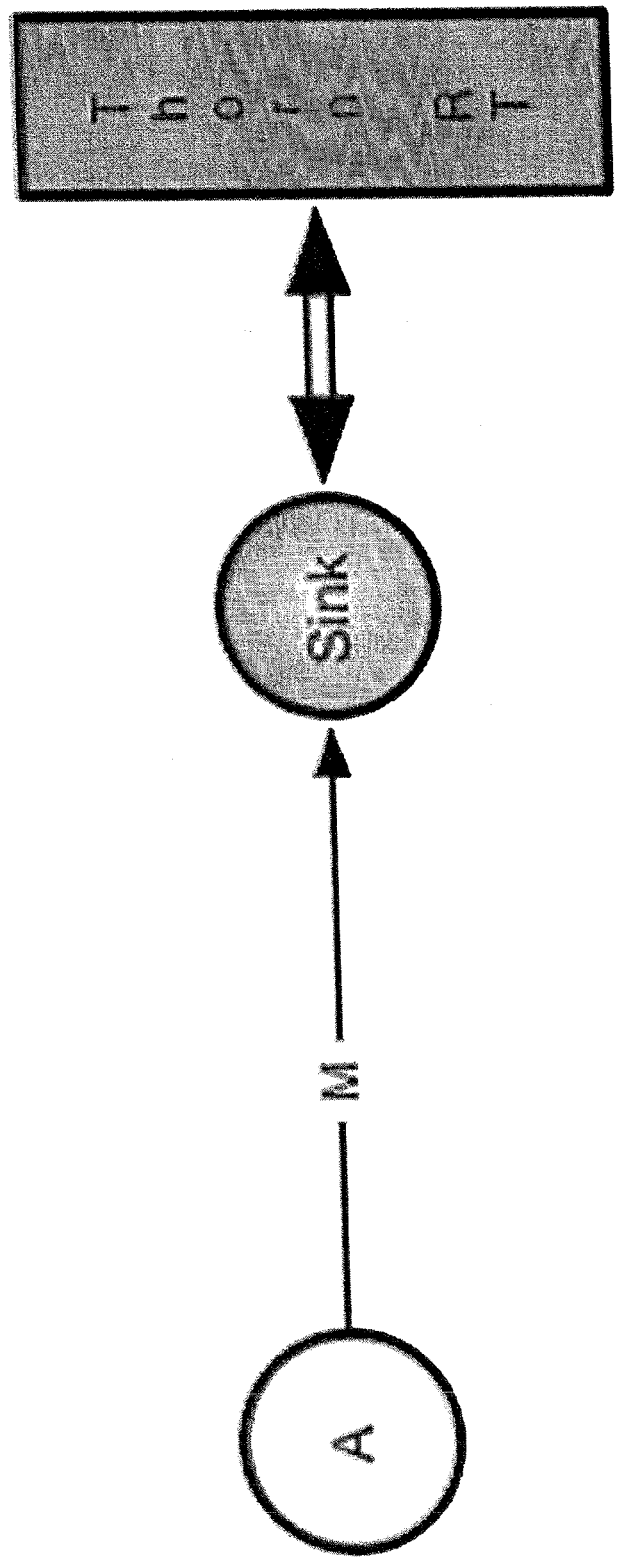
FIG. 3 illustrates flow for an atypical program using a Thorn programming model.

Before proceeding to a description of information flow, reference is now made to FIG. 3, which illustrates flow for an atypical program using a Thom programming model. In this case, component A creates and sends M via a message to the sink component, which accesses the Thorn RT. Why should the sink component trust M and execute on M?

Figure 4:
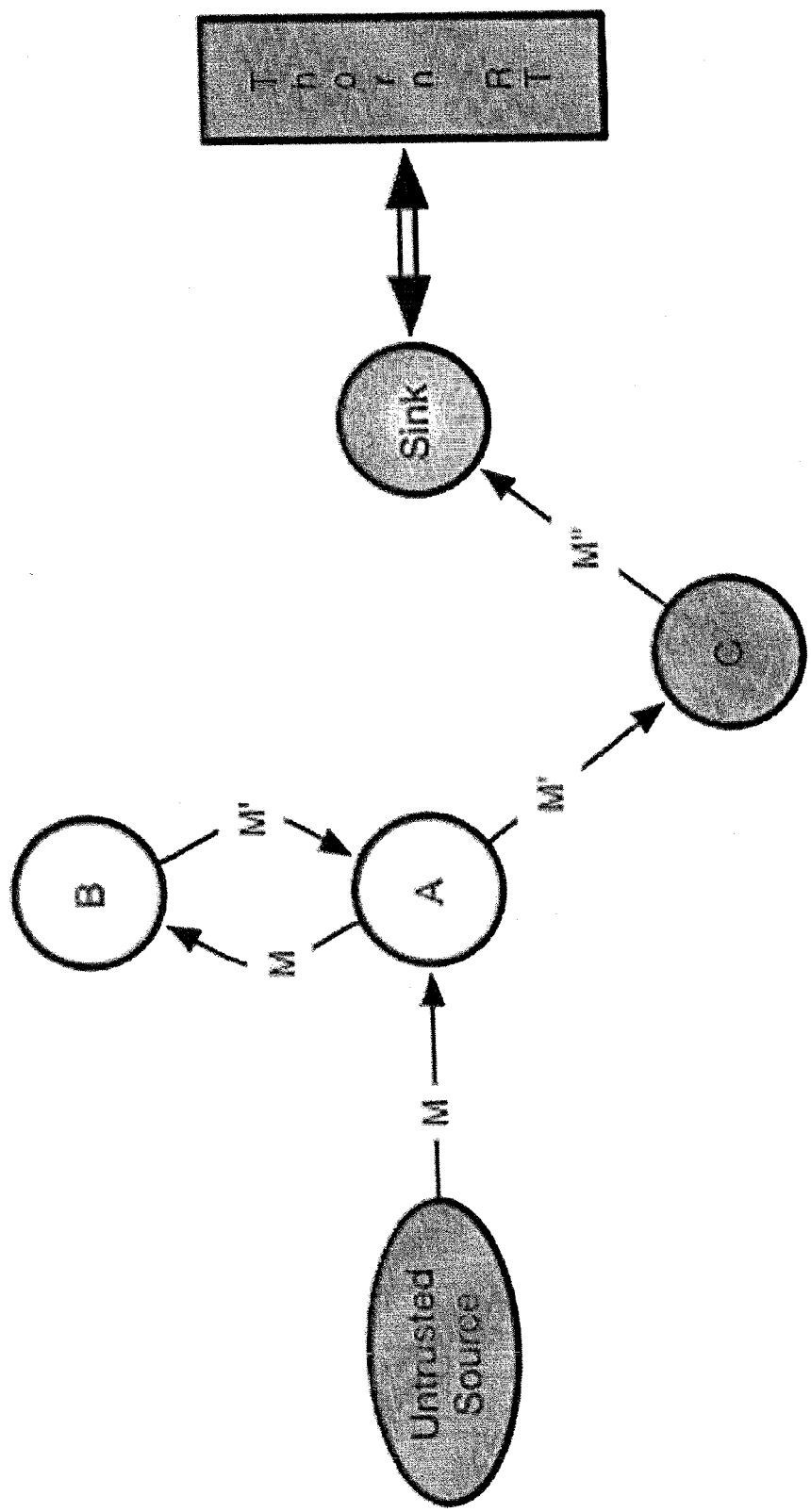
FIG. 4 illustrates an exemplary flow for a typical program using information flow in a Thorn programming model.

Both FIGS. 2 and 3 can improve access control (i.e., that only the sink component can interface with the Thorn RT) by also providing information flow. For instance, FIG. 4 illustrates an exemplary flow for a typical program using information flow in a Thorn programming model. The information flow techniques of FIG. 4 may also be applied to the flow in FIG. 3. The general idea of information flow is that a message must travel through a sanitizer/validator (in this example, component C) before reaching a sink. That is, the sink component trusts component C as a sanitizer/validator. However, in the current Thorn programming model, there is no requirement that the sink only accept information from a sanitizer/validator, and there may be multiple sanitizers/validators.

The exemplary embodiments herein provide more flexibility than this. The model proposed herein, in an exemplary embodiment, does not allow multiple sanitizers/validators. The model requires the sanitizer to forward messages to the sink. The model places the sanitization requirement on the last component before a sink. A sink is a security critical operation, or in the case of Thorn, a security critical component. One operation or component that can adversely affect the system if used improperly. Furthermore, sanitized messages cannot be saved and reused, and no one but the sink can make use of this sanitized message.

More specifically, in exemplary embodiments of the proposed model herein, sanitizers are granted capabilities such as xss_safe (cross-site scripting safe), sql_safe (structured query language safe), spelling_correct (the spelling is correct), and the like. Using a capability, a sanitizer creates a token for a message that is safe. The sinks check to see if there is a token they trust with the message.

The instant programming model uses a security provider. The security provider performs the following in an exemplary embodiment: 1) Keeps track of what capabilities each component has; 2) Grants components capabilities; and/or 3) Is used to create the signed, unforgeable, tokens attached to messages.

Figure 5:
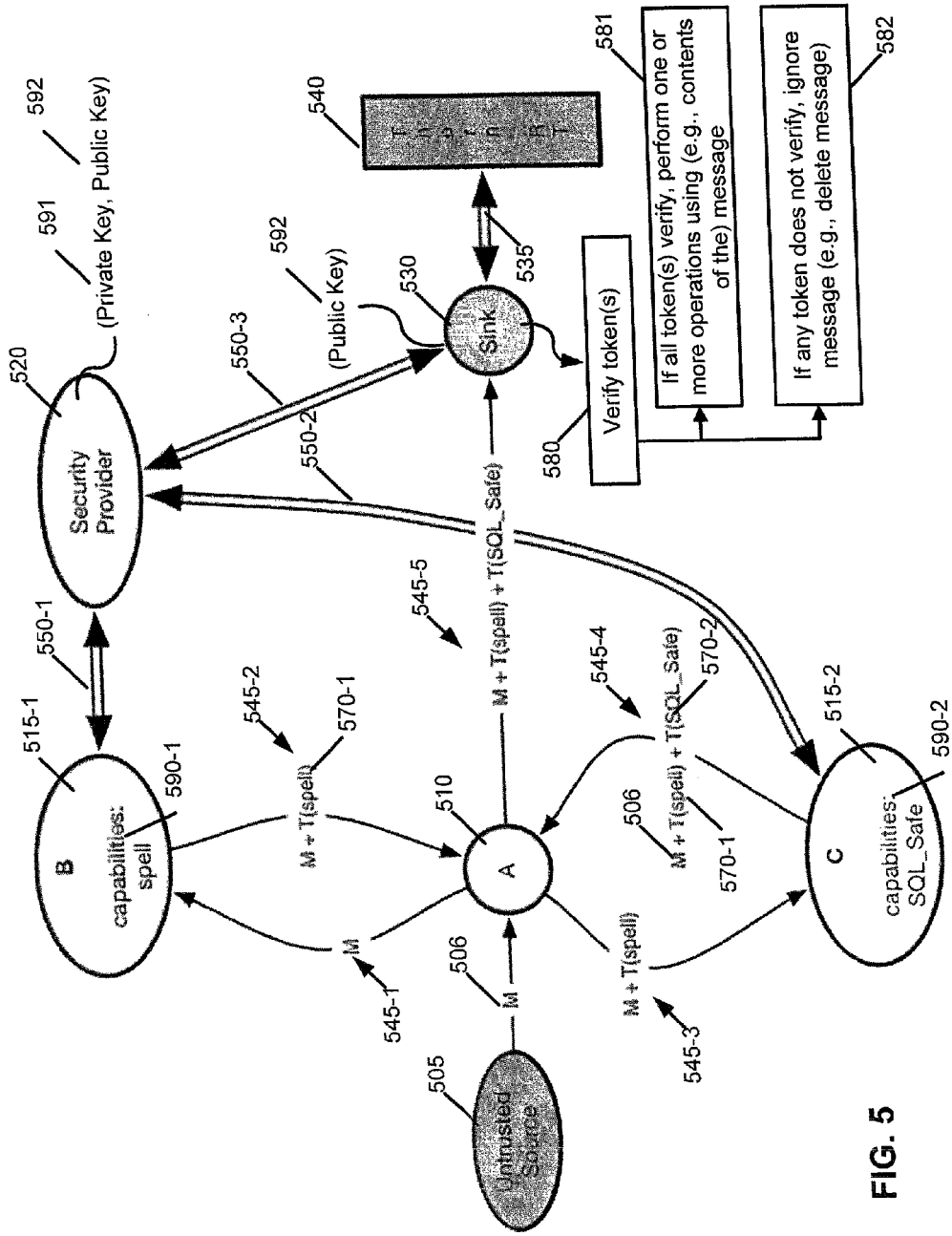
FIG. 5 illustrates an example similar to FIG. 2, using an exemplary embodiment of the instant programming model in conjunction with a Thorn programming model.

Turning to FIG. 5, this figure illustrates an example similar to FIG. 2, using an exemplary embodiment of the instant programming model in conjunction with a Thorn programming model. It is noted that the Thorn programming model is used herein to illustrate the exemplary embodiments, but the Thorn programming model is merely exemplary and other models may be used. This example mainly concentrates on the security aspects of the instant programming model and as such modification of M to M' and then to M'' is not shown. In this example, the untrusted source 505 provides information M 506 to component A 510. The component A 510 sends information M 506 via message 545-1 to the component B 515-1, which has the capability 590-1 of "spell" previously claimed by the component B 515-1 using the security provider 520 and a negotiation process using the messaging 550-1. A capability 590 can be granted to any Thorn object. The security provider 520 ensures components do not claim capabilities 590 already in use.

The component B 515-1 communicates via messaging 550-1 with the security provider 520 in order to receive a token 570-1 (created by security provider 520) shown in FIG. 4 as T(spell) and part of message 545-2 from component B 515 to component A 510. Component B 515 performs, e.g., a spelling check as its capability and the token 570-1 indicates the spelling check completed and is safe. Component A 510 passes the information M and the token 570-1 to the component C 515-2 via the message 545-3. The component C 515-2 has the capability 590-2 of "SQL_safe", which was previously claimed by the component 515-2 through a previous negotiation process with the security provider 520 via messaging 550-2. In this instance, the component 515-2 performs SQL security operations on M and T(spell). The component 515-2 communicates via messaging 550-2 with the security provider 520 to receive a token 570-2 (created by security provider 520) shown in FIG. 5 as T(SQL_Safe). The component C 515-2 returns message 545-2 to the component A 510, where the message 545-4 includes the information M 506, the token 570-1, and the token 570-2, where the token 570-2 indicates the component 515-2 performed SQL security operations on M and T(spell).

The component A 510 then forwards message 545-5, comprising the information M 506, the token 570-1, and the token 570-2, to the sink 530. In an example, the SP component 520 has a private key 591 and public key 592 (a private/public key pair). The sink 530 is provided at some time with the public key 592, which the sink 530 uses to verify token(s) (block 580) in an exemplary embodiment. The sink 530 can communicate via messaging 550-3 with the security provider 520 to determine the information (e.g., the public key 592 in this example and any other verification information) used to check the tokens 570-1, and 570-2. In one example, this communication can occur in response to initiation of the sink 530, as this minimizes further communication (e.g., over a network) of the sort where the sink 530 would communicate with the security provider 520 for each reception of a token 570 and corresponding information 506.

The sink 530, in block 581, in response to all token(s) verifying, performs one or more operations using (e.g., contents of the) message 545-5. The sink 530 then performs access 535 to the Thorn RT 540. Otherwise in block 582, that is in response to one of the tokens not verifying, the sink 530 ignores the message 545-5. The message 545-5 may be ignored, e.g., by deleting the message. Access 535 is not performed.

One example of a token is provided in detail below. In general, a token is created such that when a token is received by a component, the receiving component can verify that nothing has been tampered with during transit.

It can be seen that the exemplary programming model shown in FIG. 5 is a vast improvement over the model shown in FIG. 2, 3, or 4. For instance, each component, and particularly the sink component 530, is supplied with tokens and a system enabling the sink component 530 to trust the information received from other components.

Now that a simplified description of the exemplary embodiments has been provided, a much more detailed description concerning the exemplary embodiments is provided. For ease of reference, the rest of this disclosure is divided into sections.

1. Introduction to Mercury

The rest of this disclosure presents Mercury, a new runtime security model for actor-based languages that does not suffer from any the limitations listed in Points 1 through 7 above. The exemplary implementations described below implement Mercury inside Thorn [2], a new actor-based language [6] developed by IBM Research and Purdue University. The architecture of Thorn is centered around the concepts of components, which are isolated sequential programs communicating with each other by messages, in the style of Actors and Erlang [1]. Thorn is modified to make Mercury tightly integrated with normal Thorn behavior to minimize programmer burden required to write secure programs. Mercury has the following exemplary, non-limiting characteristics:

1. It can soundly and simultaneously enforce both access control and information flow.

2. It introduces the concept of a security provider—which correspond to a policy provider and a SecurityManager in Java and .NET, but with several differences:
   (a) In Mercury, multiple security providers can be in effect at any time, thereby granting different components the flexibility to trust different security providers.
   (b) Unlike the Java and .NET security model, Mercury does not impose any particular type on security providers; any component can be a security provider.
   (c) Components, regardless of the language in which they are written, can trust and communicate with the same security providers whether or not those providers are located in the same site as those components.

3. Individual messages passed between components can be endorsed by trusted entities in a cryptographically-secure manner, thereby overcoming the coarse-grained limitations of the same-origin-policy security model.

In this disclosure, examples are shown of how Mercury makes Web applications written in Thom secure against information-flow and access-control attacks. It is also shown how the same levels of security could not have been achieved with the security mechanisms embedded in other languages, such as Java and .NET's stack inspection or JavaScript's same-origin policy. It is also explained how the Mercury security paradigm can be applied to other popular languages that support the Actor model, such as JavaScript with the postMessage functionality in HTML5 [7].

2. Motivation and Running Example

For the purposes of this paper, a sample Thom application called EyeBook is described. It is a basic social networking site. Initially EyeBook was created without the proposed security model and suffers from several common security vulnerabilities and limitations.

2.1 EyeBook

Figure 6:
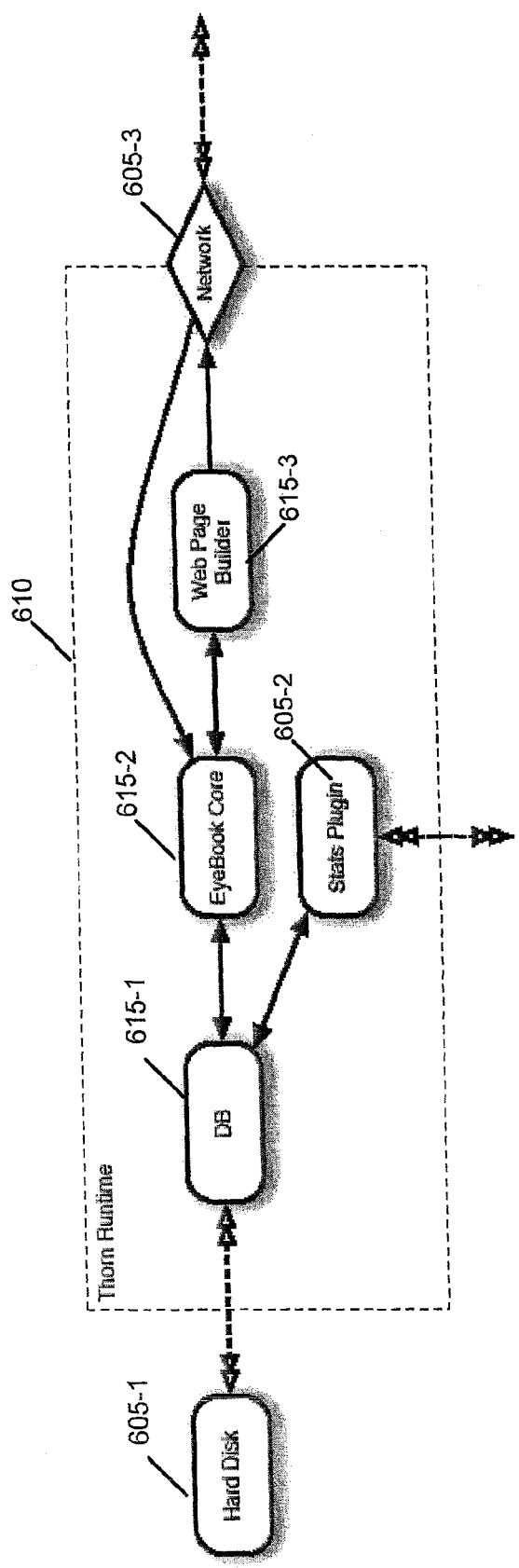
FIG. 6 is a block diagram of a Thorn application referred to as EyeBook.

EyeBook comprises three Thom components 615-1, 615-2, and 615-3, and is outlined in FIG. 6. Thom is an actor based language with strong isolation between components 615, and so the only communication between these three components is through message passing. Arrows represent the flow of messages from one component 615 to another. In addition to the three Thorn components, the Thom Runtime 610 provides special interfaces 605 to send data or commands outside of the Thorn Runtime, such as the network 605-1, hard disk 605-2, or statistics (via the Stats Plugin 605-3). It should be noted that the Thom Runtime 610 does not include all the components, but the components are all running "on top of" the Thorn Runtime 610. This is similar to how Java programs are run inside the Java runtime. An arrow leaving the dotted box that represents the Thorn Runtime 610 is a message or command that is sent to one of these special interfaces. The three Thorn components in EyeBook are Database (DB) 615-1, EyeBook Core 615-2 (referred to herein as EyeCore), and Web Page Builder 615-3.

Database 615-1 is a Thorn implementation of a basic database, or, if one prefers, a Thorn wrapper around a standard database. In this example, there may be one table of user data, indexed by user name, containing the text of each user's profile—and, as EyeBook expands, the database 615-1 will surely grow to encompass such information as the user's email address, birthday, photos, and so forth. There may be another table, kept separate for convenience, of private user data, also indexed by user name, containing the user's password, and eventually security questions and other information that should not be disseminated. It is noted that the DB component 615-1 is analogous to sink 530 of FIG. 5, in the sense that the DB component 615-1 is also a sink.

EyeCore 615-2 is the ultimate point of responsibility for the EyeBook application. EyeCore 615-2 is in charge of password checking, providing the visible parts of user records, handling profile updates, managing cookies, and so forth. EyeCore communicates extensively with the database, where the necessary information is stored. EyeCore understands a number of kinds of messages from WebPageBuilder 615-3, such as "translate this cookie into a username" and "set this user's profile".

WebPageBuilder 615-3 builds the web pages and sends the built web pages to users. It communicates with the external world via HTTP (hypertext transfer protocol), and with EyeCore via Thorn messaging. WebPageBuilder 615-3 is responsible for formatting data from EyeCore 615-2, and parsing user data (e.g., login requests) for execution by EyeCore.

2.2 Problems with EyeBook

EyeBook has the problems that many prototype web applications have. EyeBook contains all the functionality needed to work but lacks security some very important places. For example, EyeBook correctly verifies login credentials, but EyeBook does not ensure that queries sent to the database are free from injection attacks. Additionally, EyeBook does not ensure that data read out of the database is free of Cross-Site Scripting (XSS) attacks before the data are written to an output page nor does EyeBook ensure that GET or POST parameters are sanitized before writing them to an output page. Finally, EyeBook makes it quite difficult to allow third party applications or components to interact with its data. A user must either give their username and password to the third party application to give EyeBook full access to their information or the third party application cannot access any user data at all.

Database injection attacks, commonly referred to as SQL injection, occur when user provided data is interpreted by the database engine as a command. There are many ways to prevent this type of attack, prepared statements, input validation, or taint analysis. The commonality among these techniques is that something needs to endorse a database query before it is sent to the actual database.

Cross-Site Scripting (XSS) attacks can occur when user provided data appears on a web page without first going through a sanitization routine. Here again, there are many techniques that can be used to sanitizer user provided data and the important commonality is that something is done to vet the user provided data as safe.

Finally there is the problem of introducing third party applications and their access to confidential data. Mash-ups, or using components from many different, potentially non-trusting, sources have been a popular feature of the post Web 2.0 world. One of the major problems with mash-ups has been restricting access to specific data and not allowing unrestricted access to data. By default, EyeBook offers no mechanisms to integrate third-party components. If a user wanted to use a third-party component or application, they could give the component or application their username and password, but with this information, the component could do everything that the user is allowed to do. If a user wanted to use a third-party component to edit a single photo, the user would have to give the component full access to their entire account, which is not desirable because their account may contain other private information.

3 All the Thorn One Needs to Know

Thorn is a new programming language developed by IBM Research and Purdue University, intended for distributed computing—in particular, for Web services and other coordination between computers in distinct and mutually-distrustful organizations. Thom is a scripting language: it is dynamically typed, has a collection of useful types built in (e.g., files, dictionaries, XML-extensible markup language), and allows for concise expression of many common idioms and patterns. In this section, enough of Thorn is illustrated for the purposes of this disclosure. For more details on the Thom language, the reader is invited to consult the first Thom paper [2].

Scripting languages generally favor expressiveness over safety and robustness. For example, many scripting languages have a notion of object. In most cases, though certainly not all, the fields of an object are all public, and can be modified from anywhere in the program. Conversely, the design in Thorn emphasizes safety and robustness concerns more than most scripting languages. For example, in Thorn, instance variables are all private; by default, accessor methods are generated for each instance variable, giving it the appearance of being a public field. A programmer can override this decision and restrict access to any instance variable.

A Thorn program is divided into one or more "components", loosely analogous to processes. Components are isolated sequential programs communicating by messages, generally in the style of Actors [6] and Erlang [1]. As they are isolated, components do not share data references; each component's memory space is invisible to other components. Components can only share information by sending messages to each other. This feature has useful implications for security: a component can only be influenced by the outside world through messages, which appear in quite visible places, and can be vetted or analyzed as desired.

The command to create a new component is "spawn". EyeCore.th, the heart of the EyeBook application, consists of a single "spawn" command, as shown in FIG. 7.

A component 615 can define local variables, such as cookies. Definitions introduced with=are immutable; they cannot be changed. (Unlike Erlang, mutable state is allowed: "var n :=0; . . . ; n :=2*n+1;".) Thorn tables are a built-in datatype, mapping one or more keys (here just one, username) to any number of data fields (here just one, cookie).

The "sync" keyword introduces a synchronous communication. This keyword is used rather like a function or method, but set up for other components to call. When the keyword is evaluated (under control of the serve command described below), genCookie accepts a user name as a formal parameter. genCookie constructs a cookie, by appending a random digit to the username. genCookie stores the cookie in the cookies table: <cookie=c> is a one-element record associating the cookie's value, c, to the field name cookie. Finally, genCookie returns the cookie c to the sender.

The "sync" message handlers are invoked by the <-> operator, as seen in the body of "passwordIsRight?". The statement "db <-> passwordIsRight?(uname, pword)" causes a message to be sent to db (which, elsewhere, is set to a component reference to the database component). Through such message, db (e.g., DB 615-1) is asked to invoke its own "passwordIsRight?" "sync" message handler on arguments uname and pword, and to return the answer. Inter-component communication is expensive compared to intra-component method invocation. Thorn uses a larger operation symbol, <->, to make this more obvious. The <-> operator has optional clauses, allowing a timeout and giving code to execute if it times out. Thorn also offers the "async" keyword for asynchronous communication.

The body clause of "spawn" gives the code that the newly-spawned component will execute. EyeCore 615-2, like many Thorn components, simply has an infinite loop executing a "serve" command. When executed, "serve" accepts a single "sync" or "async" message, executes the corresponding message handler's body, and, for a "sync", returns the result to the sender. A number of optional clauses provide for several common cases: "before" is used to log the incoming messages, and "timeout" is used to note that EyeCore is still running.

The message cookie2user illustrates two other Thorn features: queries and patterns. Pattern matching allows inspection and destructuring of data structures. For example, the pattern "<username=u, cookie=$(c)>" matches any record which has a username field with any value, and a cookie field whose value is the same as that of the variable c; other fields are ignored. If the match succeeds, the pattern matching binds the variable u to the value of the record's username field. Thorn's pattern language is quite extensive; the pattern language incorporates extraction for all built-in types and user-defined classes, side conditions, and many conveniences.

Queries encapsulate a number of common patterns of iteration. The "% first" query performs an iteration, and returns the value of the expression u for the first iteration (or returns a special null value if there are no iterations because there was no match). This pattern occurs quite often when searching. In this case, the iteration is for "<username=u, cookie=$(c) ><~cookies". This loops over the table cookies, looking for a row which matches that pattern—that is, a row whose cookies field is equal to c. Whenever such a row is found, the username is bound to u. Rows with a different value of cookie are simply ignored.

Other possible clauses in the iteration allow filtering on some condition, early termination if some condition is satisfied, accumulation of results, and so on. When this for is used inside of "% first", the username is returned corresponding to the cookie c—assuming, of course, that cookies are not duplicated.

4 The Mercury Security Model

Mercury is a security model specifically designed for actor-based languages, where programs are partitioned into isolated components Mercury is a capability-based security model that can enforce both information-flow and access-control policies. A capability is an unforgeable and communicable proof of authority that refers to an object along with an associated set of access rights specific to that object [11]. A user or program on a capability-based system must prove possession of an appropriate capability to access an object. The advantage of a capability-based security model is that users of the system or program components can directly share capabilities with each other as long as the components do not violate the principle of least privilege, which dictates that no principal in a computer system be granted more rights than those needed to complete the task the principal was assigned [16].

A fundamental concept in Mercury is that of a "security provider". A security provider is a standard Thorn component that initializes itself by calling a special "initSP" Thorn-provided function. Calling "initSP" sets up certain data structures inside the Thorn runtime. In particular, "initSP" equips the security provider with a public and private key pair. The public key is wrapped in a digital certificate that is signed by the Thorn runtime, which, therefore, acts as a certificate authority. By doing this, the Thorn runtime does not endorse the security provider in any way, but just certifies the identity of the security provider. Once that is done, a security provider is allowed to grant capabilities to components. In Mercury, a capability is represented as nearly-arbitrary data—generally something meaningful to the security provider.

Messages exchanged between components are tagged with security tokens, which are data structures representing unforgeable integrity and/or confidentiality endorsements. A security token for a particular message is forged by a security provider upon receiving request from a component with the capability necessary to issue that token.

For example, a component may be capable of sanitizing input strings against cross-site scripting (XSS) attacks, which consist of embedding malicious code inside what would otherwise be plain HTML text. When displayed on a victim's computer, that code will be executed bypassing any same-origin policy restriction. Any message from a potentially untrusted client can be sanitized by removing any code that may have been embedded in it. The sanitizing component can receive from a security provider the capability to certify that messages are XSS-attack free. Then, for every message the sanitizing component sanitizes, that component can ask the security provider to forge a message-specific security token, which asserts that the given message is safe with respect to XSS.

The creation of a security token takes place through Thorn runtime function calls. FIG. 8 illustrates an example of messaging 550-2 for token 870 creation for an SQL sanitizer component 515-2. The service provider (SP) 520 creates token 870 (which is similar to token 570-2 previously described) based on capability k and message msg. The message msg may be considered to be the information M 506 previously described. Upon receipt of a message, Thorn cryptographically verifies that the message itself and the tokens attached to the message have not been tampered with during transit (possibly through third-party components). At that point, the receiving component can pattern-match on the tokens in the message.

Since any component 515 can become a security provider 520, components must, in an exemplary embodiment, state which security providers they trust. This is usually done once when the component 515 is spawned, but the list of security providers 520 that a component trusts may be changed dynamically as the component is running. Tokens received from security providers 520 that a component does not trust are ignored by the Thorn runtime.

More formally, a security token 870 in an exemplary embodiment for a message m is a tuple <k, c, spID, sign>, where:

1 k is the capability that the message is endorsed with;
2 c is the ID of the component endorsing the message—such component must have been granted capability k;
3 spID is the component ID of the security provider which made the token and granted k to c;
4 sign is the digital signature of the tuple <k, c, spID, m>, where m is the message msg.

In this embodiment, the security provider hashes the concatenation of k, c, spID and the message (m) being endorsed and signs the hash with its private key. There is no need to include the message in the token because the token is attached to the message. This signature is performed so that when a token is received, the receiving component can verify that nothing has been tampered with during transit. It should be noted that this token is merely an example. In another example, for instance, the spID might not be used, and therefore the sign could be the digital signature of the tuple <k, c, m>.

A security provider is responsible for ensuring a component owns a capability 590 before making a token. This ensures that when a component 515 receives a token 570, 870 containing a capability, a component 515 owning that capability 590 has previously endorsed the message. Components are allowed to request any capability the components desire; security providers can decide whether or not to grant such requests. For programming convenience, capabilities can be any valid Thorn object; the capability may be something meaningful to the security provider. FIG. 9 illustrates an example of messaging 550-2 for capability creation for the SQL sanitizer component 515-2. In this example, the capability k is the "SQL_Safe" capability 590-2 shown in FIG. 5. Once a capability has been constructed in a given security provider 520, the security provider must, in an exemplary embodiment, ensure (block 910) that no other component 515 has that capability 590 unless the capability 590 is delegated to them by a component in possession of that capability. The SP 520 either responds with an indication ("You do have Capability k) in a message that the capability 590 is granted, or responds with an indication ("You do not have Capability k) in a message that the capability 590 is not granted. The SP component 520 may therefore (e.g., in order to perform block 910) also keep track (block 915) of granted capabilities, e.g., and also may keep track (block 915) of corresponding components having those granted capabilities.

The flexibility of allowing components to use any Thorn object as a capability is nice, but this flexibility does have a drawback. Since the first component to create a capability owns the capability, a component is not guaranteed to own a specific capability. For example, one component might want to use the string "read" as a capability. However, a second component might also want to use "read" as a capability. Only one component will be allowed to create this capability in a given security provider and any other components that hard coded a pattern match for the capability "read" might behave incorrectly since the "read" capability might not have been generated by the component that they trusted. To help mitigate this problem, security providers 520 should let components know if their request to create a capability was a success (e.g., by a "You do not have Capability k" message). Furthermore, there are library functions to create a random object as a capability. This would remove the notion that capabilities are predictable. If the functions are random, then one can only pattern match against the functions once one is notified that a component has created the capability. This means that instead of two components asking for read, they would both just ask for random capabilities. They might both still mean "read", but they would not name-collide. Components may also be allowed to delegate capabilities to other components.

Since there may be many independent parts of a program, and there may even been third party components running in a site among first party components, it would be cumbersome to require everyone to use the same security provider. Multiple security providers allow individual components to trust different security providers. First, this means that each user created application can customize their security provider trivially since the user is in complete control of the security provider. This is harder in Java because there is only one security manager that must be in charge of everything, including security of all the built in libraries. Second, this facilitates mixing of different code bases. One can take two code bases and mix them together and the code bases can each trust their own security provider, and the code bases do not need to agree on one central security provider (e.g., thereby promoting mash-ups and similar concepts).

5. Securing EyeBook

EyeBook can be secured using Mercury. The corresponding EyeBook application 1000 is outlined in FIG. 10. This application 1000 is similar to the unsecured EyeBook in FIG. 6; however, there are new components 515 that endorse messages before the messages are sent to critical components or interfaces. Additionally, there is now a Security Provider (SP) 520 that will create tokens for these endorsed messages and keep track of what capabilities each component 515 possesses. This and subsequent figures with the SP 520 do not show connections to the SP component to maintain clarity.

The new components 515 in the secure version of EyeBook are: SQL Sanitizer 515-2, XSS Sanitizer 515-3, Spell Checker 515-1, Profanity Checker 515-4, and Authenticator 515-5. Each of these components 515 asks for and is granted a specific capability by the SP 520. During program execution, each of these components performs the sanitization or checking that the component 515 is supposed to and asks the SP 520 to create a token for the component 515 to attach to the message, as previously described.

Each of the following sections depict specific security features that have been added to EyeBook. Before any of these features are enabled, the core system must be initialized. In addition to each component declaring that the component 515 trusts the SP 520 as the Security Provider, the components 515 from FIG. 10 need to initialize themselves. This is because they will own specific capabilities. Each component 515 must send a message asking the SP component to grant the component 515 the capability 590 the component 515 wants. Then components 615 may query other components to identify capabilities the other components have so they know what to look for. For example, the DB component 615 would query the SQL Sanitizer 515-2 and find out what capability the SQL Sanitizer 515-2 is using to endorse messages. It is noted one feature of the Thorn RT is that the runtime must know all components because the runtime must be able to route messages. So a component could query the runtime for a list of all messageable components.

5.1 Access Control

Figure 11:
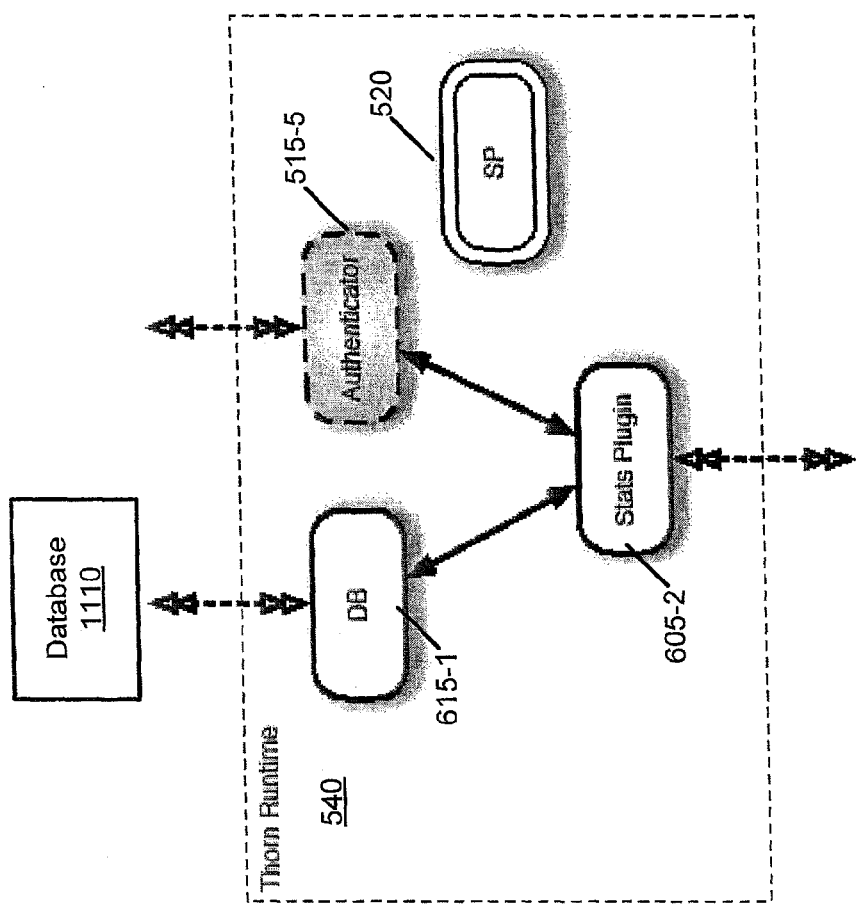
FIG. 11 illustrates simple access control in accordance with an exemplary embodiment of the invention.

The simplest faun of security enforced by information flow is access control. EyeBook uses this access control to limit access to trusted resources, like the database, to fully-trusted third party plugins. There are four components involved in this simple access control policy and their interaction is outlined in FIG. 11. The first component is the component attempting to get access to a restricted resource. In the example, it is the Stats Plugin component 605-2. The Stats Plugin component 605-2 computes statistics about the number and variety of users using EyeBook. The Stats Plugin component 605-2 can be thought of as a component that was created to monitor EyeBook. The Stats Plugin component 605-2 needs access to specific database queries but should not have full access because the component does not need the access and the Stats Plugin component 605-2 might be controlled by employees of EyeBook who should not have full access to the database 1110. The second component is the SP 520 and this component performs its normal functions of granting capabilities and making tokens. The third component is the Authenticator 515-5. The Authenticator 515-5 listens for a login message comprising login credentials; in EyeBook the login credentials are ID and password. The Authenticator verifies the credentials and if the credentials are valid, grants a unique capability to the component (Stats Plugin component 605-2) which sent the login message. The fourth and final component is the one containing the restricted resource. In this example, this is the DB component 515-1.

Table 1, shown in FIG. 12, outlines the communication that takes place to authenticate a third party plugin and send a message to the database. Steps 1-3 must only happen once, during the initial login phase. In these steps, the third-party component (Stats Plugin 605-2) sends its credentials to the Authenticator component 515-5. The Authenticator component 515-5 performs the actions needed to verify the credentials. This could be querying the database, querying a file on disk, accessing an in-memory structure, or any other way of validating credentials. If the credentials are not valid, the Authenticator component 515-5 sends an invalid login response back to the third-party component and communication ends. If the credentials are valid, the Authenticator component 515-2 sends a message to the SP component 520 asking the SP component 520 to grant the "data totals" capability to Stats Plugin 605-2. In EyeBook, the Authenticator component 515-5 has the "data totals" capability, so the Authenticator can delegate this capability at will. But it doesn't have the "format hard drive" capability, and thus cannot delegate this capability to anyone.

At this point, the initial login is completed and the Stats Plugin component 605-2 has the capability to issue "data totals" requests to the DB component 615-1. However, the security model requires the SP component 520 to create an unforgeable token, T, to attach to a message before the DB component 615-1 will accept the message. This is because the DB component 615-1 does not trust any third-party components and in particular the DB component 615-1 only trusts the SP component 520 when dealing with tokens and capabilities.

When the Stats Plugin 605-2 wants to query the DB component 615-1, the Stats Plugin component sends a message to the SP component 520 asking the SP component 520 to make a token for a specific message (e.g., "Get total number of users") with its "data totals" capability. This is performed in line 4 of Table 1. Since the Stats Plugin component 605-2 as the aforementioned capability, the SP component 520 creates a token for the message and sends the token back to the Stats Plugin component (line 5). Now in line 6, the Stats Plugin component 605-2 can issue a request to the DB component 615-1. When the DB component 615-1 receives this message, the DB component 615-1 verifies that the token contains the capability the DB desires, performs a query, and sends the answer back to the Stats Plugin component 605-1. This interaction does not need database sanitization because no data from the message being sent is present in the database query.

Table 2, shown in FIG. 13, is an optimized message sequence for Stats Plugin component 605-2 to login to and query the database. This optimization may be performed because the message has not changed, so the previous token is still valid. This leaves EyeBook open to an attack where the capability could be revoked from Stats Plugin component 605-2 but since Stats Plugin component 605-2 already has the token, the Stats Plugin component 605-2 can continue to send the message. If EyeBook wanted to prevent this attack, EyeBook could force the Stats Plugin component 605-2 to include a nonce on every message, which would ensure that each message was unique and token-message pairs could not be reused. This is a tradeoff between efficiency and security and Mercury is flexible enough to allow both scenarios. Mercury defaults to not include nonces on all messages because it is believed this is the more common case.

5.2 Code Injection Prevention

Code injection detection and prevention is one of the natural uses of information flow. Code injection, which includes both cross-site scripting (XSS) attacks and SQL injection attacks, occurs when untrusted data is interpreted as part of a command rather than as data. There are many ways to detect and prevent code injection attacks, but they all have one thing in common: before a command with untrusted data in it is executed, the command is first inspected. This inspection can range from static parse tree analysis to dynamic execution in a sandbox. Once the command that contains untrusted data passes the inspection, the command is provided to the underlying system to execute. When the inspector also changes the command to make the command safe to execute, the inspector is commonly referred to as a sanitizer and the term sanitizer is used herein to refer to both inspectors and sanitizers. The information flow property that must be enforced is a command must first flow through a sanitizer before the command flows to the underlying system.

Figure 14:
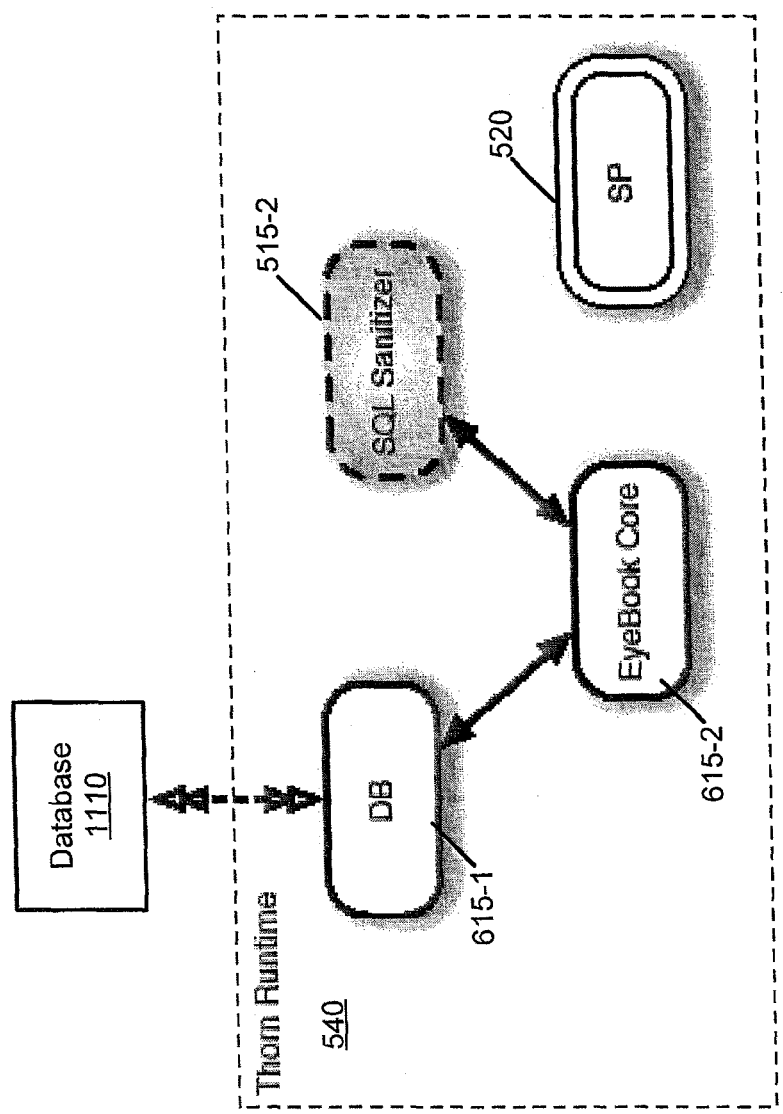
FIG. 14 illustrates an example of sending a safe query to a database in accordance with an exemplary embodiment of the instant invention.

Turning to FIGS. 14 and 15, FIG. 14 illustrates an example of sending a safe query to a database in accordance with an exemplary embodiment of the instant invention, and FIG. 15 is a table (Table 3) of a message sequence to send a safe query to the database. Using the security model in this disclosure, it is trivial to protect critical system resources. For example, to protect a database, the database (e.g., the database 1110) can be modified to require all messages to the database 1110 have been endorsed by a database query inspector. FIG. 14 shows the portion of EyeBook that is responsible for ensuring only safe messages are sent to the DB component. Table 3, in FIG. 15, shows the communication required to send messages to the DB component and showcases the differences between this scenario and the access control scenario. It assumes that the SQL Sanitizer component 515-2 and the SP component 520 have already been initialized and gone through their handshake to grant SQL Sanitizer component 515-2 the "SQL_safe" capability 590-2.

In the access control scenario, a component contacted the Authenticator component once and the component was granted a capability. In the code injection scenario, the only component in EyeBook that is trusted as a database query inspector is the SQL Sanitizer component 515-2. This means that every message sent to the DB component must first go through the SQL Sanitizer component 515-2. There is no other way for the message to contain the token that the DB component 615-1 requires.

The communication from Table 3 shows one full use of the SQL Sanitizer component 515-2 to endorse a message before sending the message to the DB component 615-1. The EyeBook Core component 615-2 must first send the database query to be analyzed to the SQL Sanitizer component 515-2. Then the SQL Sanitizer component performs its sanitization, which ensures the resulting safe DB query is free from SQL injection attacks. At this point, the SQL Sanitizer endorses this message by asking for the SP component 520 to make a token for the message and then the SQL Sanitizer component 515-2 sends the safe DB query and token back to the EyeBook core component 615-2 so the core component can send the safe DB query to the DB component 615-1. It is important to note that the token that is sent back to the EyeBook Core component is only valid for the safe DB query that was also sent. If EyeBook Core component 615-2 changes the query sent to the DB component 615-1, the token will not pass the integrity checks (i.e., will not be verified) when the DB component receives the query and the entire message will be ignored.

There are quite a few messages being sent in this example, but just like with access control, there is a way to reduce the number of messages that must be sent. FIG. 16 is a table (Table 4) of an optimized message sequence to send a safe query to the database. Table 3 (FIG. 15) showed the most generic use of the SQL Sanitizer component 515-2, but the SP component 520 can also act as a message forwarder and Table 4 (FIG. 16) shows what the resulting communication is. Instead of sending five messages, only three messages will be sent for every interaction with the DB component 615-1.

Figure 17:
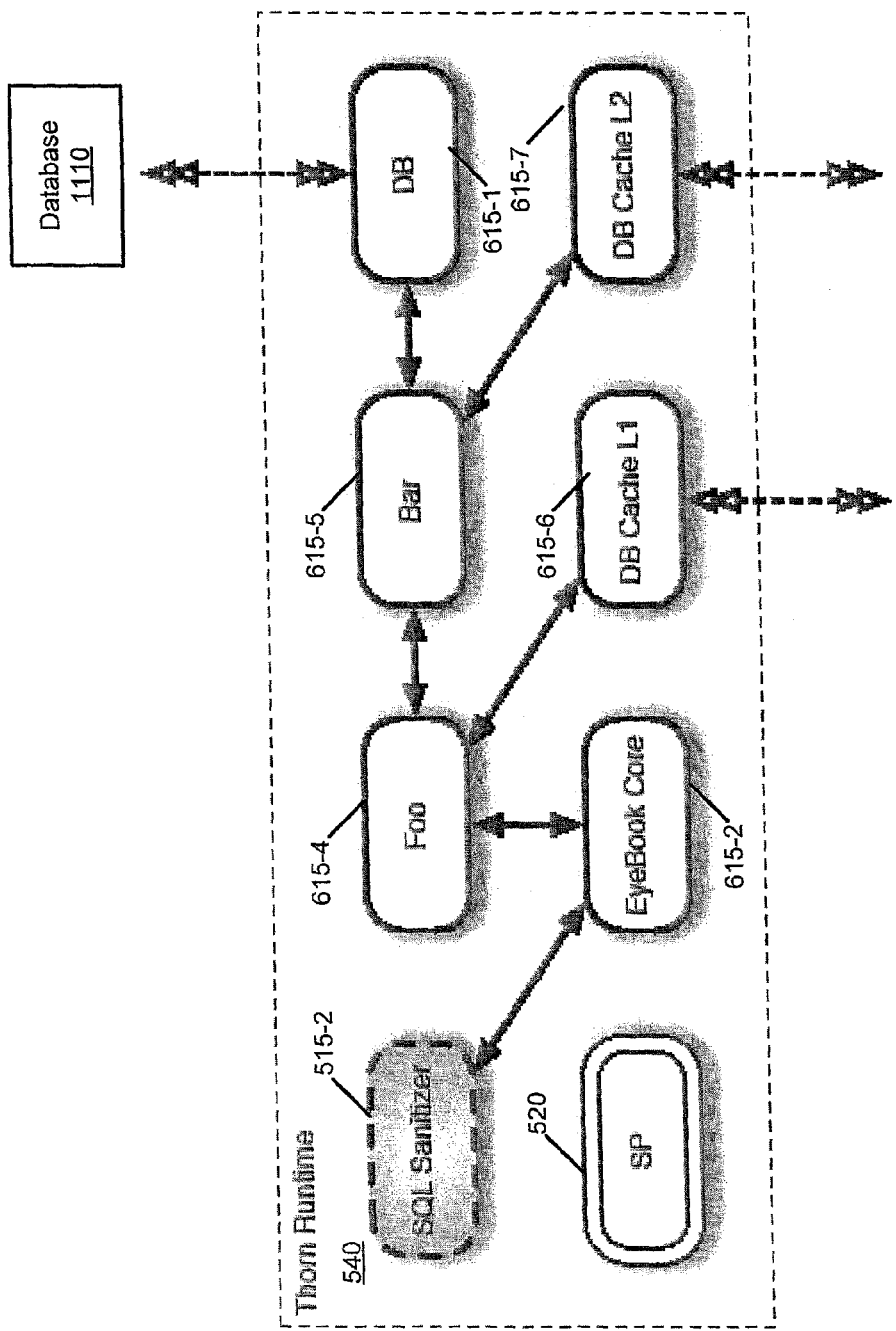
FIG. 17 is an illustration of database protection with proxies.

The security model also allows for proxies and other intermediaries between token generation and token consumption. In the scenarios presented thus far, once a token has been attached to a message, the token is sent directly to the component that wants to interrogate that token. For example, if the database in EyeBook tried to implement a simple form of caching like in FIG. 17, the message with the token attached might have to go through several different components before a message can be sent back to the originating component. With a simple identity based scheme, it would be impossible to tell if the message being sent to the DB component 615-1 has been declared safe or not. Since the token declaring that the message is safe for database consumption is attached to the message, every component in the message chain (e.g., components 615-4, 615-5, 615-6, and 615-7) can verify that the database command is safe to execute. Furthermore, since the token includes a signed hash of important data, including the message and capability, it is impossible for one of the intermediary components 615-4 through 615-7 to be malicious and change the message into an attack. If they did, the integrity check on the token would not be valid when the next component receives the message and the message would be ignored.

5.3 Chaining Tokens

There are situations where many tokens must be appended to a message before a component will accept that message. One such case occurs in the secure version of EyeBook. A message must be free of cross-site scripting attacks, spelled correctly, and (unlike competing social networks) free of profanity before the message can be output to a web page.

Figure 10:
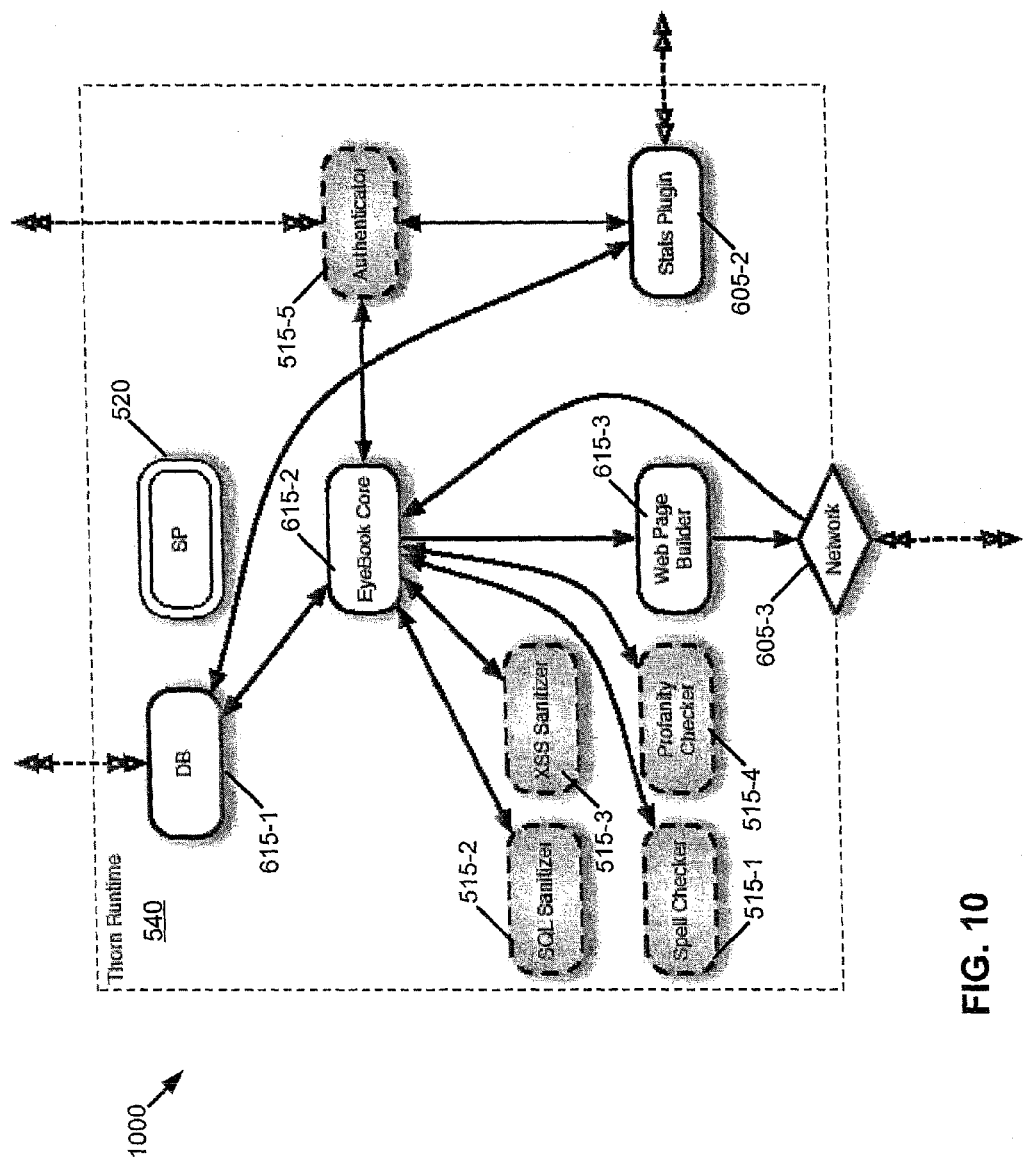
FIG. 10 illustrates the application EyeBook of FIG. 6 implemented in an exemplary embodiment of the programming model provided herein.
Figure 18:
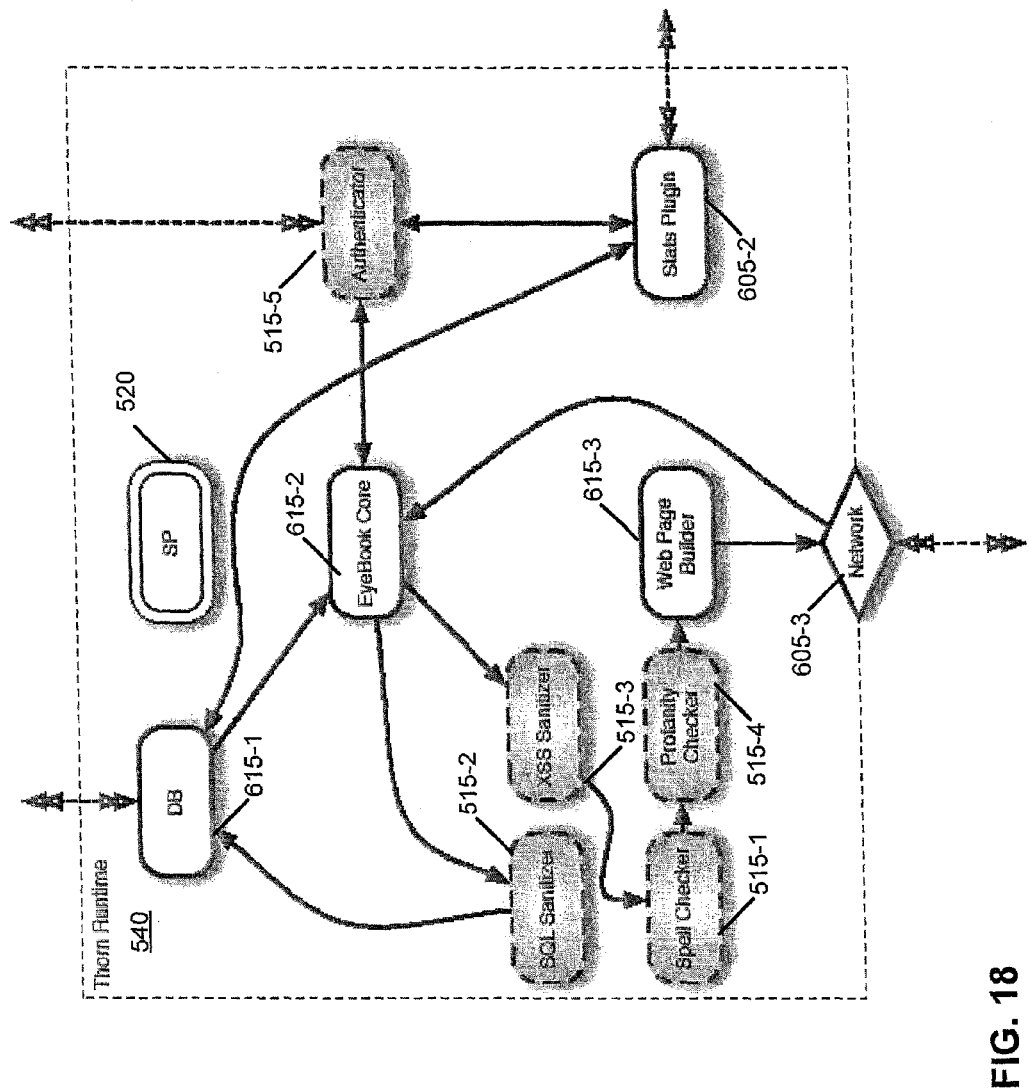
FIG. 18 is an optimized version of the EyeBook application shown in FIG. 10.

FIG. 18 is an optimized version of the EyeBook application shown in FIG. 10 where messages are forwarded by endorsers and the SP component 520, and FIG. 18 shows that a message must pass through all three endorsing components before it proceeds to WebPageBuilder 615-3. WebPageBuilder checks to see if all required tokens are present and, if any are missing, rejects the message. This is an example of what is referred to herein as chaining tokens, a process where additional tokens are attached to an already endorsed message.

Each of the three endorsing components (cross-site scripting free 515-3, spell checked 515-1, and profanity checked 515-4) will act exactly like a proxy with the exception that the specific component will add an additional token to the message, assuming the message passes the checks. These three components should not modify the message, because, if any one of them did, it would mean previous tokens would no longer pass the integrity check. This is an intended, albeit conservative feature. This design feature comes from the fact that endorsements are only valid for a specific message, if that message changes at all, the endorsement might not be valid anymore. An example of this situation would be if a spell checker changed the text <scirpt> to <script>. Before spell checking and correction, the XSS Sanitizer 515-3 might have allowed a benign tag to be present. After spell checking and correction, the tag is no longer benign and could lead to an attack.

Figure 19:
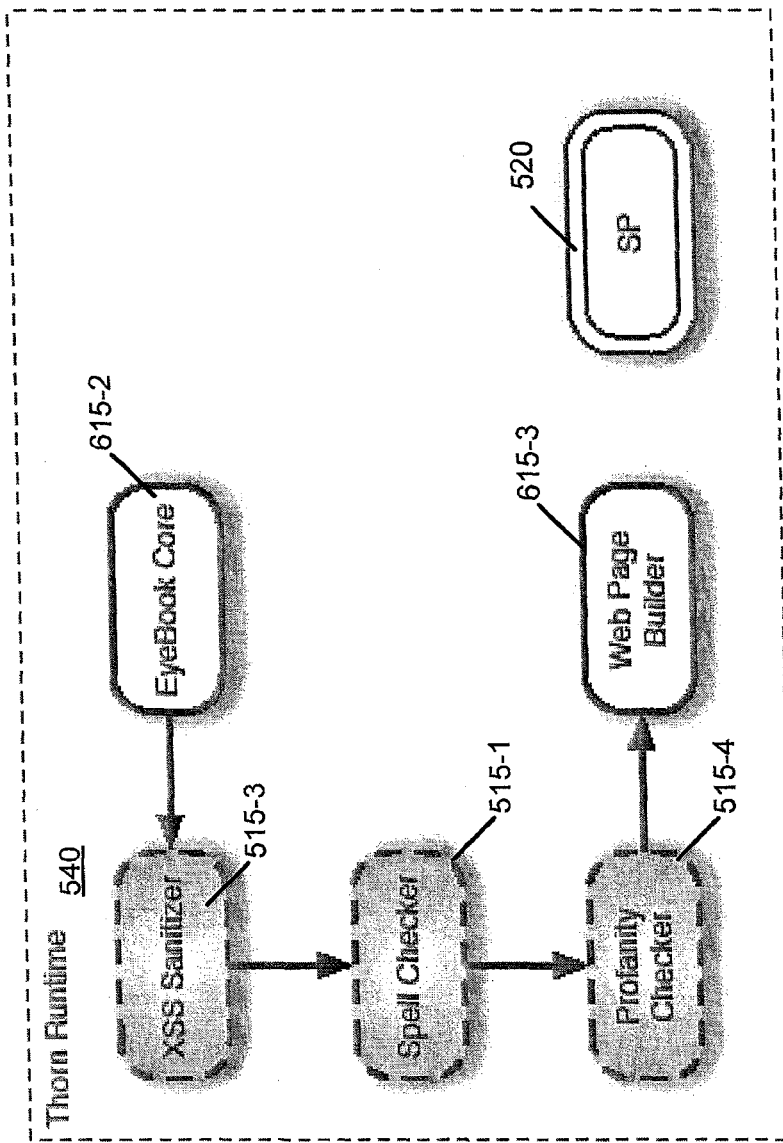
FIG. 19 illustrates token chaining.

FIG. 19 shows the section of EyeBook that is responsible for this logic. FIG. 18 is using the optimized form of communication that forwards a message as soon as a token is generated. When the WebPage Builder component 615-3 receives a message, this component simply has to check for the three required tokens and if they are all there, the component knows it is safe to output to the web page.

It is noted that, in an exemplary embodiment, a sink can determine whether a message has passed or not passed a capability endorsement by determining whether or not a token corresponding to the capability is attached. In the example of FIG. 19, for instance, the WebPageBuilder component 615-3 can determine the message did not pass the endorsement of the XSS sanitizer component 515-3 in response to receiving a message without a token from the XSS Sanitizer 515-3 but with the original message and tokens from the Spell Checker 515-1 and the Profanity Checker 515-4. The WebPageBuilder component 615-3 could then make a determination as to what to do in response, e.g., ignore the message. In other examples, perhaps the token from the XSS Sanitizer 515-3 is expanded to include an indication as to whether the message is endorsed or not.

It would be unfortunate if each sanitizer and checker in the pipeline needed to know about the next. However, as Thorn's component IDs (identifications) are first-class data, these components can be written generically. Each message merely needs to contain a list of the component IDs of the endorsers that it must pass, and each endorser can send the message to the next one in the list.

5.4 Photo Editor

One of the most powerful features of this security model is the ability to work across programs and across languages. JavaScript provides the Same Origin Policy (SOP) as a mechanism to safely combine programs. The problem with SOP is that it is far too coarse. If the developer wants two programs to interact, he must give the two programs full access to each other.

An exemplary embodiment of the instant security model attaches tokens to messages. Messages can be sent from one Thorn site to another, from one Thorn program to another, or even between a Thorn site and any program that reads and writes the Thorn message format. Since Thorn only guarantees sender identity for each component inside a Thorn runtime, other techniques must be used to verify and enforce identity for non-Thorn components such as public-private key encryption, certificate authorities, and SSL (security socket layer). The ways in which identify is ensured and enforced outside of Thorn is outside the scope of this disclosure.

EyeBook does not currently have a photograph sharing service, but many other social networking sites do have one. One of the major differences between traditional applications and Web 2.0 applications is data are owned by web services instead of users. A user is no longer able to easily take a photo from one application and edit the photo in a separate application. Currently there are three options to edit a photograph on a social networking site:

1 Use the photo editing tools present on the social networking site;

2 Use an online service and give them your username and password so they can access your photograph stored on the social networking site;

3 Download the photograph, edit it using a local photograph editing application, and re-upload the edited photograph.

None of these options are optimal. The first option restricts the user to whatever is implemented in the social networking site, the second option gives a third party full access to their account, and the third option is cumbersome, especially for users who do not wish to purchase or pirate photo-editing software. Our security model can be used to give an online service access to a particular photograph to edit.

Figure 20:
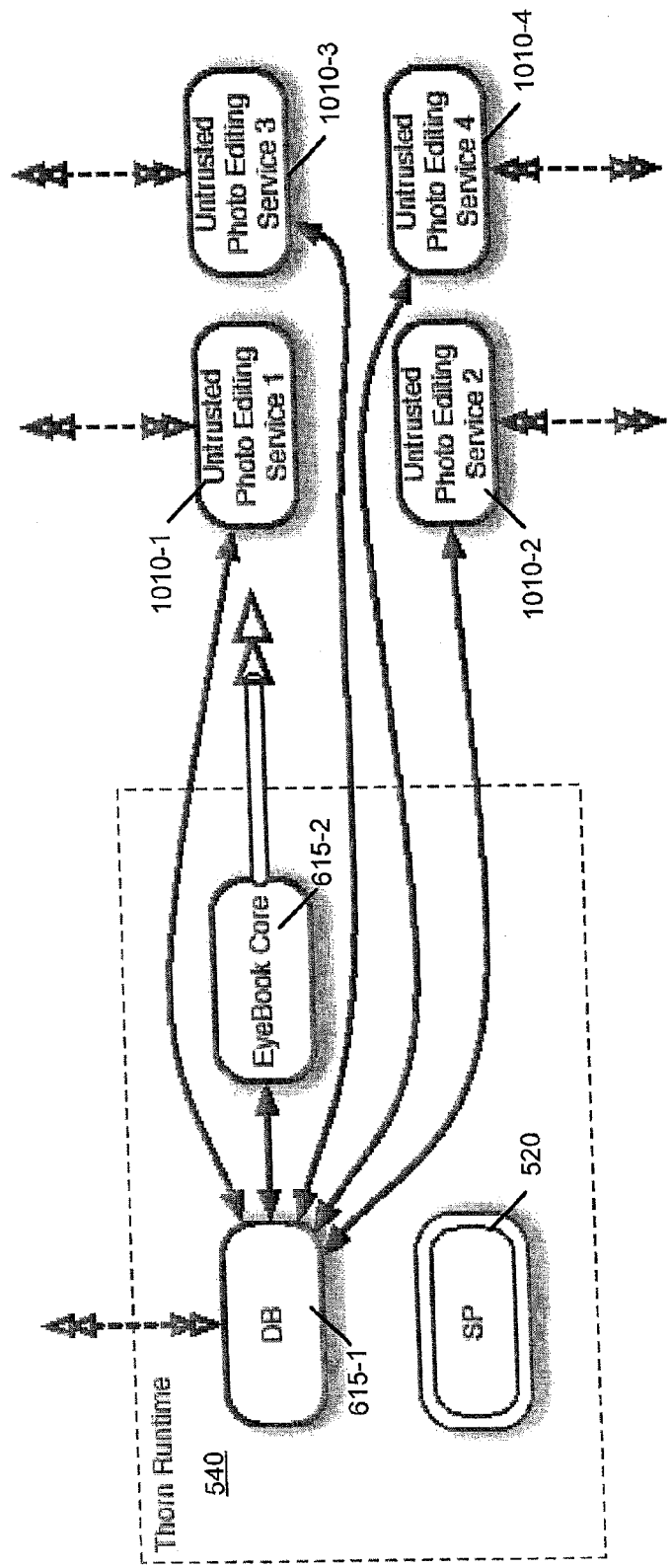
FIG. 20 illustrates general interaction between a secured EyeBook application and photograph editing services.

FIG. 20 shows the general interaction for these photograph editing services. The services 1010-1 through 1010-4 must be integrated with EyeBook so that the services 1010 are listening for and respond to Thorn messages from EyeBook. When a user decides to edit a photograph, the user can select which service her or she wants to use and EyeBook can provide a popup window that loads that service's website with the photo loaded in the service's website. When the user is done editing, the user simply uses the normal save functionality of the photograph editing service and the modified picture is uploaded back to his or her account on EyeBook. EyeBook does not need to trust these photograph editing services and the user only needs to trust them not to misuse their one picture the user is editing and not maliciously change the photograph before uploading the photograph back to their account. Specifically, the user does not need to trust the photograph editing service with their password, username or all of their photographs and other information.

Once the user selects the service he or she wants to use, an exemplary embodiment of the instant security model may be used to provide that service with access to the photograph the user wants to edit. Table 5 (see FIG. 21) outlines the messages involved in delegating a photograph editing service, editing the photograph, and saving the photograph back to the user's account. The first action that is taken is the DB component 615-1 asks the SP component 520 to generate a unique capability. This can be done by creating a randomly generated capability or some other more complex method. This new capability k is sent to the DB component 615-1 and the DB component adds the new capability to a map from capabilities to photograph unique IDs. Now when the DB component receives a message to save or load a photograph, the DB component checks to see if the component has the appropriate token is attached to the message to access that photograph. Now that the DB component is set up to allow access to the photograph, the capability must be granted and sent to the photograph editing service. The DB component needs to send a grant capability message to the SP component, who will grant this capability to the photograph editing service and send it the capability in a Thorn message. At this point, the EyeBook Core component 615-2 needs to send a message to the photograph editing service to provide the service with the unique ID for the photo to be edited and the photo editing service should respond with a link to open in a popup window on the client's computer.

The capability has now been distributed, the photograph editing service has been notified what the service will edit, and the user has been sent a link to use the photograph editing service. The photograph editing service must actually load the photograph now. The service does this by sending a load request message with capability k to the SP component so a token t can be made. The SP component 520 attaches Token t to that message and forwards the token on to the DB component 615-1, which verifies the token and responds with the image to edit. The photograph editing service 1010 cannot access any other photographs because the service 1010 does not have the capabilities necessary to access them. Once the user is done editing the photograph, the photograph editing service sends a message with the save command and the finished photograph to the SP component 520 so the SP component 520 can make a token and forward the message with the token along to the DB component. The photograph is now edited and saved back into the user's account on EyeBook.

Over time, the photograph editing service may have capabilities to access all of the photographs on EyeBook. There is nothing that can be done to prevent the service 1010 from saving local copies of the photographs when the photos are edited. However, the instant security model allows capabilities to be ignored or revoked. After a set time, the DB component can remove the capability from its map so it will no longer be valid to access photographs in the database. If the DB component wanted to actually delete the capability from every component which has the capability and from the SP component, the DB component can send a message to the SP component to remove that capability from every component which has the right to use the capability.

Figure 22:
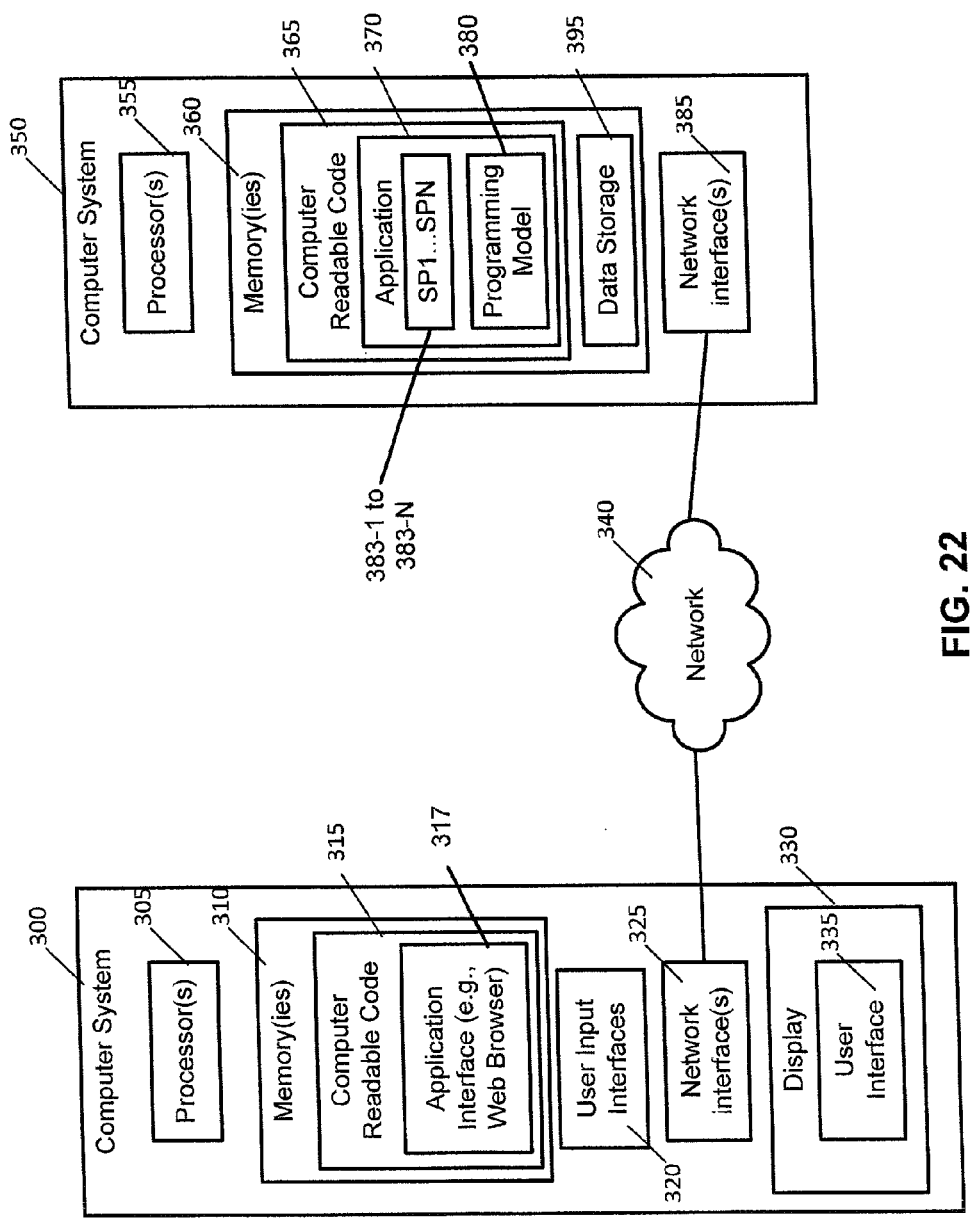
FIG. 22 is a block diagram of a system suitable for performing exemplary embodiments of the instant invention.

Turning to FIG. 22, an exemplary system is shown that suitable for performing exemplary embodiments of the invention. This system comprises a computer system 300 comprising one or more processors 305, one or more memories 310, one or more user input interfaces 320 (e.g., touchscreen interfaces, mouse interfaces, keyboard interfaces, and the like) and one or more wired or wireless network interfaces 325. The computer system 300 comprises (as shown in FIG. 3) or is coupled to a display 330 having a user interface 335 through which a user can interact with the system, and also provide input for the computer system 300. The one or more memories 310 include computer readable code 315 that comprises an application interface 317, which may be a Web browser.

This example is a networked example, where the computer system 300 communicates with another computer system 350 comprising one or more processors 355, one or more memories 360, and one or more wired or wireless network interfaces 385. The one or more memories 360 comprise computer readable code 365 comprising an application 370, of which the EyeBook application 1000 previously described is an example. The one or more memories 360 also comprise in this example data storage 395, which could be database 1110 or any other storage useful for the application 370. The application 370 further includes a version of programming model 380 (e.g., including a runtime such as a Thorn Runtime) as described in detail above. The application 370 may also comprise multiple service providers 383-1 to 383-N, where each service provider is a version of the service provider 520 previously described above. The computer systems 300, 355 communicate via a network 340, e.g., the Internet. In this example, the computer system 300 is a client and the computer system 350 is a server. The application interface 317 may be as simple as a Web interface, or could be more complex, such as an applet or client program. In this example, the computer system 300, acting through the application interface 317, could be the untrusted source 505 of FIG. 5, and the application 370 ensures that the information provided by the untrusted source is secure, as previously described.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

THE FOLLOWING REFERENCES ARE
REFERRED TO ABOVE

1. J. Armstrong. Programming Erlang: Software for a Concurrent World. Pragmatic Bookshelf, 2007.
2. B. Bloom, J. Field, N. Nystrom, J. Ostlund, G. Richards, R. Strnisa, J. Vitek, and T. Wrigstad. Thorn: Robust, Concurrent, Extensible Scripting on the JVM. In Proceeding of the 24th ACM SIGPLAN Conference on Object Oriented Programming Systems Languages and Applications, OOPSLA '09, pages 117-136, New York, N.Y., USA, 2009. ACM.
3. E. Geay, M. Pistoia, T. Tateishi, B. Ryder, and J. Dolby. Modular String-Sensitive Permission Analysis with Demand-Driven Precision. In 31st International Conference on Software Engineering (ICSE 2009), Minneapolis, Minn., USA, 2009.
4. L. Gong, M. Mueller, H. Prafullchandra, and R. Schemers. Going Beyond the Sandbox: An Overview of the New Security Architecture in the Java Development Kit 1.2. In USENIX Symposium on Internet Technologies and Systems, Monterey, Calif., USA, December 1997.
5. L. Gong and R. Schemers. Implementing Protection Domains in the Java Development Kit 1.2. In Proceedings of the Network and Distributed System Security (NDSS 1997) Symposium, San Diego, Calif., USA, December 1997.
6. C. Hewitt, P. Bishop, and R. Steiger. A Universal Modular Actor Formalism for Artificial Intelligence. In Proceedings of the Third International Joint Conference on Artificial Intelligence (IJCAI 1973), August 1973.
7. HTML5, w3.org/TR/htm15.
8. L. Koved, M. Pistoia, and A. Kershenbaum. Access Rights Analysis for Java. In 17th ACM SIGPLAN Conference on Object-Oriented Programming, Systems, Languages, and Applications (OOPSLA 2002), pages 359-372, Seattle, Wash., USA, November 2002. ACM Press.
9. D. Kozen. Language-based security. In M. Kutylowski, L. Pacholski, and T. Wierzbicki, editors, Proc. Conf. Mathematical Foundations of Computer Science (MFCS'99), volume 1672 of Lecture Notes in Computer Science, pages 284-298. Springer-Verlag, September 1999.
10. C. Lai, L. Gong, L. Koved, A. J. Nadalin, and R. Schemers. User Authentication and Authorization in the Java™ Platform. In 15th Annual Computer Security Applications Conference (ACSAC 1999), pages 285-290, Scottsdale, Ariz., USA, December 1999. IEEE Computer Security.
11. H. M. Levy. Capability-based Computer Systems. Butterworth-Heinemann, Newton, Mass., USA, 1984.
12. A. C. Myers. JFlow: Practical Mostly-static Information Flow Control. In POPL, 1999.
13. Open Web Application Security Project (OWASP), www.owasp.org.
14. M. Pistoia, A. Banerjee, and D. A. Naumann. Beyond Stack Inspection: A Unified Access Control and Information Flow Security Model. In 28th IEEE Symposium on Security and Privacy, pages 149-163, Oakland, Calif., USA, May 2007.
15. M. Pistoia, R. J. Flynn, L. Koved, and V. C. Sreedhar. Interprocedural Analysis for Privileged Code Placement and Tainted Variable Detection. In ECOOP, 2005.
16. J. H. Saltzer and M. D. Schroeder. The Protection of Information in Computer Systems. In Proceedings of the IEEE, volume 63, pages 1278-1308, September 1975.
17. Same-origin Policy, mozilla.org/projects/security.
18. A. Shinnar, M. Pistoia, and A. Banerjee. A language for information flow: dynamic tracking in multiple interdependent dimensions. In Proceedings of the ACM SIG ¬PLANFourth Workshop on Programming Languages and Analysis for Security, PLAS '09, pages 125-131, New York, N.Y., USA, 2009. ACM.
19. N. Swamy, B. J. Corcoran, and M. Hicks. Fable: A language for enforcing user-defined security policies. In Proceedings of the 2008 IEEE Symposium on Security and Privacy, pages 369-383, Washington, D.C., USA, 2008. IEEE Computer Society.
20. IBM Java Security Workbench Development for Java (SWORD4J), www.alphaworks.ibm.com/tech/sword4j.
21. W. Wulf, E. Cohen, W. Corwin, A. Jones, R. Levin, C. Pierson, and F. Pollack. Hydra: the kernel of a multiprocessor operating system. Commun. ACM, 17:337-345, June 1974.

What is claimed is:

1. An apparatus, comprising:
   one or more memories comprising computer readable code; and
   one or more processors in response to execution of the computer readable code causing the apparatus to perform at least the following:
   providing an application comprising: a programming model comprising a service provider, one or more first components, one or more second components, and one or more sinks, where each of the one or more second components is assigned a unique capability, and wherein the first and second components and sinks communicate using messages;
   a given one of the first components routing a message comprising information from the given first component to at least one of the one or more second components and then to a selected one of the sinks;
   each of the at least one of the second components sending the message to the service provider;
   the service provider creating a token corresponding at least to a received message and a unique capability assigned to an associated one of the second components and sending the token to the associated one of the second components; and
   the selected sink receiving the message and a token corresponding to each of the at least one second components, verifying each received token, and either accepting the message in response to each of the received tokens being verified and performing one or more actions using the message or ignoring the message in response to at least one of the received tokens not being verified.

2. The apparatus of claim 1, wherein the one or more processors in response to execution of the computer readable code further cause the apparatus to perform at least the following: the service provider receiving a message from a given component in the application requesting creation of a capability, and the service provider responding to the given component with a message comprising an indication the given component has the requested capability, and wherein the given component becomes a second component in response to receiving the indication the given component has the requested capability.

3. The apparatus of claim 2, wherein the one or more processors in response to execution of the computer readable code further cause the apparatus to perform at least the following: prior to the service provider responding to the given component with a message comprising an indication the given component has the requested capability, the service provider ensuring no other component has the requested capability prior to granting the capability to the given component and to responding to the given component with the message comprising the indication the given component has the requested capability.

4. The apparatus of claim 3, wherein the one or more processors in response to execution of the computer readable code further cause the apparatus to perform at least the following: the service provider keeps track of capabilities granted to second components in order to perform the ensuring no other component has the requested capability prior to granting the capability to the given component.

5. The apparatus of claim 1, wherein the one or more processors in response to execution of the computer readable code further cause the apparatus to perform at least the following: the sink performs verifying each received token at least using a public key, the message, a capability of the second component that corresponds to the token, and a digital signature corresponding at least to the message and the capability of the second component that corresponds to the token.

6. The apparatus of claim 5, wherein the one or more processors in response to execution of the computer readable code further cause the apparatus to perform at least the following: the sink receiving the public key from the service provider.

7. The apparatus of claim 5, wherein the one or more processors in response to execution of the computer readable code further cause the apparatus to perform at least the following: the service provider using a private key corresponding to the public key as part of a key pair to create the digital signature using at least the message and the capability of the second component that corresponds to the token.

8. The apparatus of claim 5, wherein the token comprises a tuple <k, c, sign>, where k is a capability with which the message is endorsed, c is an identification of the second component endorsing the message, and sign is the digital signature.

9. The apparatus of claim 8, wherein verifying each received token further comprises the sink using the public key to determine a digital signature from a tuple <k, c, m>, where m is the message, comparing the determined digital signature with the digital signature received in the token, and determining the token passes verification in response to the determined digital signature matching the digital signature received in the token.

10. The apparatus of claim 8, wherein the token comprises a tuple <k, c, spID, sign>, where spID is a component identification of the security provider which made the token and granted the capability k to the second component having the identification c.

11. The apparatus of claim 10, wherein verifying each received token further comprises the sink using the public key to determine a digital signature from a tuple <k, c, spID, m>, where m is the message, comparing the determined digital signature with the digital signature received in the token, and determining the token passes verification in response to the determined digital signature matching the digital signature received in the token.

12. The apparatus of claim 1, wherein the one or more second components comprise a plurality of second components, and wherein the routing the message comprising information from the given first component to at least one of the one or more second components and then to a selected one of the sinks further comprises:

1) routing the message comprising the information from the given first component to one of the plurality of second components;
2) receiving at the given first component a response message comprising the information and a token from the one second component;
3) routing the message comprising the information and any previously received token from the given first component to another of the plurality of second components;
4) receiving at the given first component a response message comprising the information, the any previously received token and another token from the another second component; and
5) performing (3) and (4) until the message comprising the information has been routed to all of the plurality of second components.

13. The apparatus of claim 12, wherein the one or more processors in response to execution of the computer readable code further cause the apparatus to perform at least the following: each of the plurality of second components performs a capability endorsement corresponding to an associated capability on at least the information and any received tokens.

14. The apparatus of claim 13, wherein the performing of the capability endorsement determines whether the information and any received tokens is either endorsed or not endorsed according to the associated capability.

15. The apparatus of claim 1, wherein the one or more second components comprise a plurality of second components, and wherein the routing the message comprising information from the given first component to at least one of the one or more second components and then to a selected one of the sinks further comprises:

1) routing the message comprising the information from the given first component to one of the second components in a chain of the plurality of second components;
2) the one second component routing a message comprising the information and a token from the one second component another second component in the chain; and
3) performing (1) and (2) until the message comprising the information has been routed to all of the plurality of second components in the chain.

16. The apparatus of claim 15, wherein the one or more processors in response to execution of the computer readable code further cause the apparatus to perform at least the following: each of the plurality of second components performs a capability endorsement corresponding to an associated capability on at least the information and any received tokens.

17. The apparatus of claim 16, wherein the performing of the capability endorsement determines the information and any received tokens is either endorsed or not endorsed according to the associated capability.

18. The apparatus of claim 15, wherein the one or more processors in response to execution of the computer readable code further cause the apparatus to perform at least the following: a final one of the second components in the chain routes the message and all tokens from the second components in the chain to the selected sink.

19. The apparatus of claim 1, wherein the one or more processors in response to execution of the computer readable code further cause the apparatus to perform at least the following: the sink performs verifying of each received token and either accepting or ignoring the message only in response to receiving a token from each of the at least one second components, and ignoring the message in response to not receiving a token from each of the at least one second components.

20. The apparatus of claim 1, wherein there are a plurality of service providers, and wherein each second component has a unique assigned capability granted by one of the plurality of service providers.

* * * * *